(12) United States Patent
Bloch et al.

(10) Patent No.: US 10,987,204 B2
(45) Date of Patent: Apr. 27, 2021

(54) ORAL CARE IMPLEMENT

(71) Applicant: Colgate-Palmolive Company, New York, NY (US)

(72) Inventors: Brian Bloch, Hillsborough, NJ (US); Thuanchong Tan, Shanghai (CN)

(73) Assignee: Colgate-Palmolive Company, New York, NY (US)

( * ) Notice: Subject to any disclaimer, the term of this patent is extended or adjusted under 35 U.S.C. 154(b) by 63 days.

(21) Appl. No.: 16/462,577

(22) PCT Filed: Nov. 20, 2017

(86) PCT No.: PCT/US2017/062533
§ 371 (c)(1),
(2) Date: May 21, 2019

(87) PCT Pub. No.: WO2018/094319
PCT Pub. Date: May 24, 2018

(65) Prior Publication Data
US 2019/0290410 A1    Sep. 26, 2019

(30) Foreign Application Priority Data

Nov. 21, 2016 (CN) .......................... 201611028323.7

(51) Int. Cl.
*A61C 17/34* (2006.01)
*A61C 17/00* (2006.01)
(Continued)

(52) U.S. Cl.
CPC .......... *A61C 17/349* (2013.01); *A46B 5/0012* (2013.01); *A46B 5/0095* (2013.01);
(Continued)

(58) Field of Classification Search
CPC .......... A46B 2200/1066; A46B 5/0012; A46B 5/0095; A46B 9/005; A46B 9/045;
(Continued)

(56) References Cited

U.S. PATENT DOCUMENTS 4,929,180 A * 5/1990 Moreschini .......... A61C 17/005
433/166
5,360,339 A * 11/1994 Rosenberg ........... A61C 17/005
433/165
(Continued)

FOREIGN PATENT DOCUMENTS

CN    1753633      3/2006
CN    101018511    8/2007
(Continued)

OTHER PUBLICATIONS

International Search Report and Written Opinion of the International Searching Authority in International Application No. PCT/US2017/062533, dated Feb. 7, 2018.

*Primary Examiner* — Marc Carlson

(57) ABSTRACT

Oral care implement that can be detachably coupled to a handle having a motor. The oral care implement includes a drive assembly to operably engage the motor, a head portion that includes a body, a first carrier comprising a plurality of bristle tufts extending from the first carrier, the first carrier comprising a central passageway; and a second carrier disposed within the central passageway of the first carrier, the second carrier comprising an elastomeric cleaning element extending from the second carrier. The drive assembly may be operably coupled to each of the first and second carriers and configured to: (1) produce a first oscillatory motion of the first carrier about a first rotational axis; and (2) produce a second oscillatory motion of the second carrier, the second oscillatory motion being counter to the first oscillatory motion.

12 Claims, 19 Drawing Sheets

(51) Int. Cl.
*A46B 5/00* (2006.01)
*A46B 9/00* (2006.01)
*A46B 9/04* (2006.01)

(52) U.S. Cl.
CPC .............. *A46B 9/005* (2013.01); *A46B 9/045* (2013.01); *A61C 17/005* (2013.01); *A61C 17/3418* (2013.01); *A61C 17/3436* (2013.01); *A46B 2200/1066* (2013.01)

(58) Field of Classification Search
CPC .............. A61C 17/005; A61C 17/3418; A61C 17/3436; A61C 17/349
See application file for complete search history.

(56) References Cited

U.S. PATENT DOCUMENTS

| | | | |
|---|---|---|---|
| 5,416,942 A | 5/1995 | Baldacci et al. | |
| 5,584,690 A | 12/1996 | Maassarani | |
| 6,018,840 A | 2/2000 | Guay et al. | |
| 6,032,313 A | 3/2000 | Tsang | |
| 6,146,140 A | 11/2000 | Bailey | |
| 6,751,823 B2 | 6/2004 | Biro et al. | |
| 6,813,793 B2 | 11/2004 | Eliav | |
| 6,889,401 B2 | 5/2005 | Fattori et al. | |
| 7,140,058 B2 | 11/2006 | Gatzemeyer et al. | |
| 7,160,108 B2 | 1/2007 | Jaffe | |
| D561,475 S | 2/2008 | Wang et al. | |
| 7,562,411 B2 * | 7/2009 | Gavney, Jr. | A46B 9/005 15/110 |
| D606,316 S | 12/2009 | Driesen et al. | |
| D606,318 S | 12/2009 | Driesen et al. | |
| D606,757 S * | 12/2009 | Driesen | D4/101 |
| D611,711 S | 3/2010 | Driesen et al. | |
| D612,611 S | 3/2010 | Brown, Jr. et al. | |
| 7,725,972 B2 | 6/2010 | Berde et al. | |
| 7,743,448 B2 * | 6/2010 | Gavney, Jr. | A61C 17/34 15/22.1 |
| 7,814,603 B2 * | 10/2010 | Gavney, Jr. | A46B 15/0002 15/110 |
| 7,861,356 B2 | 1/2011 | Kunath et al. | |
| 7,934,284 B2 * | 5/2011 | Braun | A61C 17/22 15/22.1 |
| 7,941,886 B2 | 5/2011 | Chenvainu et al. | |
| 7,955,079 B2 * | 6/2011 | Chronister | A61C 17/005 433/125 |
| D643,218 S | 8/2011 | Wagner | |
| 8,141,192 B2 | 3/2012 | Gavney, Jr. | |
| 8,250,694 B2 | 8/2012 | Gatzemeyer et al. | |
| 8,276,231 B2 * | 10/2012 | Gavney, Jr. | A46B 9/04 15/22.1 |
| 8,302,238 B2 | 11/2012 | Biro et al. | |
| 8,444,416 B2 * | 5/2013 | Chenvainu | A46B 11/0086 433/80 |
| 8,578,544 B2 | 11/2013 | Brown et al. | |
| D703,443 S * | 4/2014 | Gatzemeyer | D4/101 |
| 8,695,149 B2 | 4/2014 | Braun et al. | |
| 8,763,194 B2 * | 7/2014 | Jimenez | A46B 9/04 15/110 |
| 8,784,102 B1 * | 7/2014 | Kumar | A61C 1/141 433/166 |
| D711,655 S * | 8/2014 | Gatzemeyer | D4/101 |
| D734,614 S | 7/2015 | Driesen et al. | |
| 9,144,299 B2 | 9/2015 | Fritsch et al. | |
| 9,826,822 B2 | 11/2017 | Geiberger et al. | |
| 10,080,428 B2 | 9/2018 | Kern | |
| D846,285 S * | 4/2019 | Bloch | D4/104 |
| 2004/0154112 A1 * | 8/2004 | Braun | A61C 17/22 15/22.1 |
| 2005/0166343 A1 * | 8/2005 | Gavney, Jr. | A46B 15/0032 15/110 |
| 2005/0273954 A1 * | 12/2005 | Gavney, Jr. | A61C 17/349 15/22.1 |
| 2006/0064827 A1 | 3/2006 | Chan | |
| 2006/0117506 A1 * | 6/2006 | Gavney, Jr. | A61C 17/349 15/22.1 |
| 2007/0130705 A1 | 6/2007 | Chan et al. | |
| 2009/0007357 A1 | 1/2009 | Meadows et al. | |
| 2010/0115724 A1 | 5/2010 | Huang | |
| 2010/0132141 A1 | 6/2010 | Chan et al. | |
| 2010/0299857 A1 * | 12/2010 | Stief | A46B 15/0002 15/106 |
| 2014/0338140 A1 * | 11/2014 | Ji | A46B 9/04 15/167.1 |
| 2019/0174906 A1 * | 6/2019 | Bloch | A46B 5/0095 |
| 2019/0289994 A1 * | 9/2019 | Bloch | A61C 17/3436 |

FOREIGN PATENT DOCUMENTS

| | | |
|---|---|---|
| CN | 101583296 | 11/2009 |
| CN | 104320992 | 1/2015 |
| EP | 0435329 | 9/1991 |
| EP | 0744139 | 11/1996 |
| EP | 1132022 | 9/2001 |
| JP | S59-37357 A | 2/1984 |
| WO | 2001/001817 | 1/2001 |
| WO | 2006/037065 | 4/2006 |
| WO | 2015/016595 | 2/2015 |

* cited by examiner

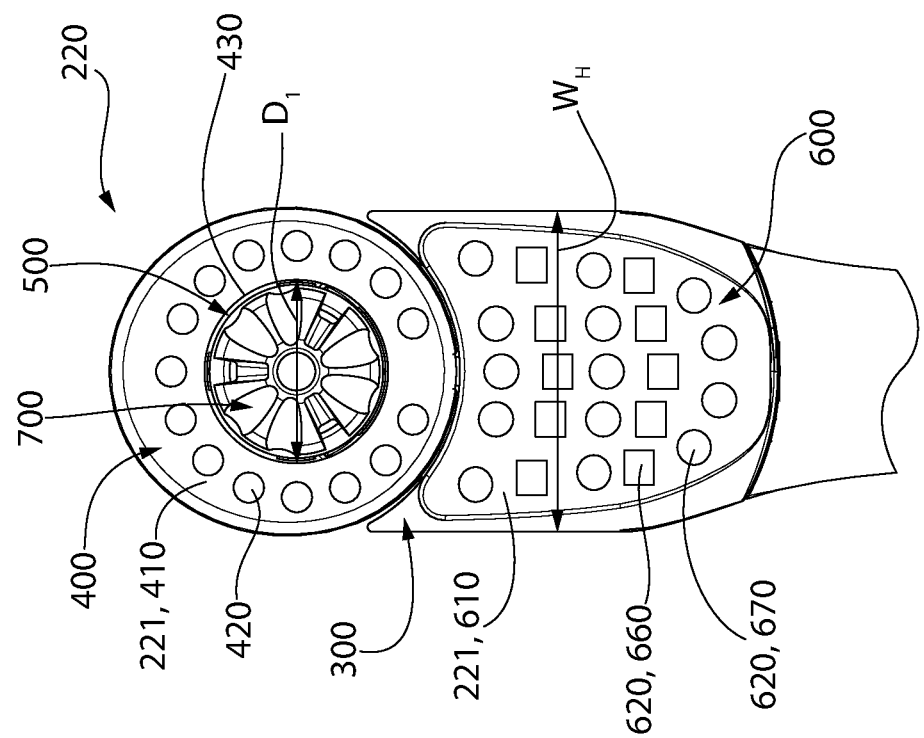
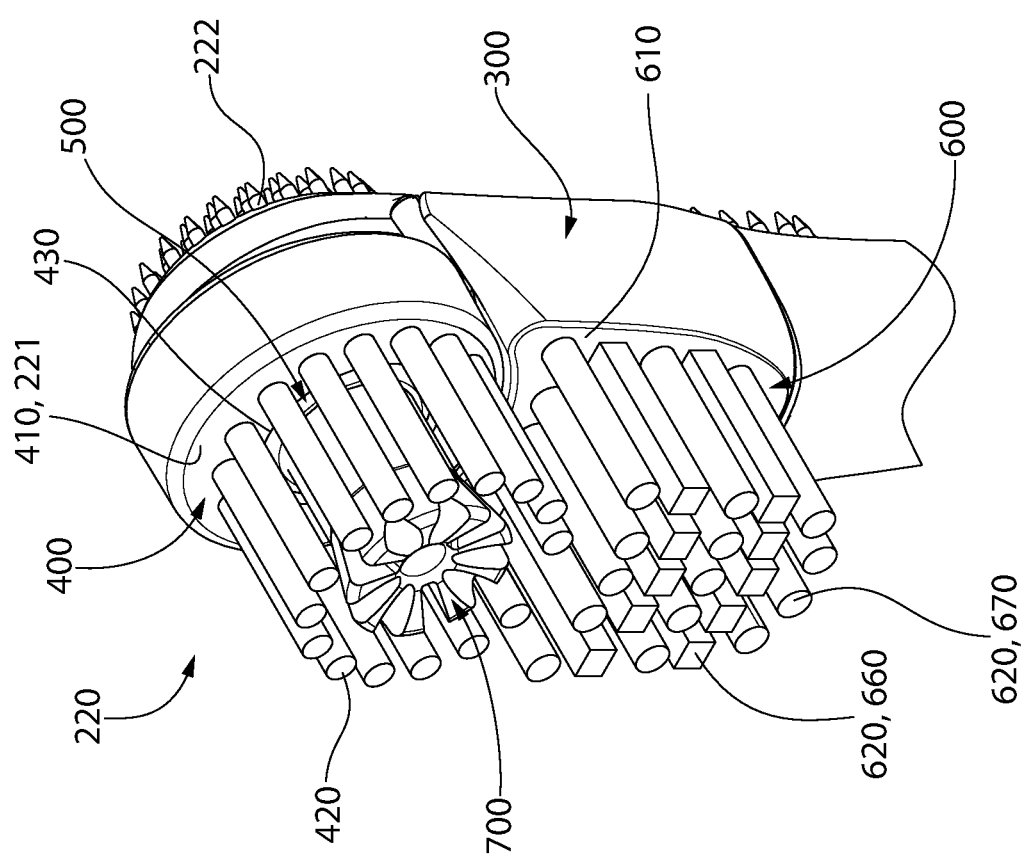

ORAL CARE IMPLEMENT

BACKGROUND

Powered toothbrushes may include a head having rotational cleaning elements. In these toothbrushes, the movement of the cleaning elements may provide a specific cleaning effect to the oral cavity during usage. However, there is room for improvement in both the geometry of the various cleaning elements as well as the movement of the cleaning elements within the head.

BRIEF SUMMARY

The present invention may be directed to an oral care implement for detachable coupling to a handle having a power source and a motor including a drive shaft, the oral care implement comprising a drive assembly having a first portion configured to operably engage the drive shaft of the motor; a head portion comprising a body, a first carrier comprising a plurality of bristle tufts extending from the first carrier, the first carrier comprising a central passageway, and a second carrier disposed within the central passageway of the first carrier, the second carrier comprising an elastomeric cleaning element extending from the second carrier; and the drive assembly having a second portion operably coupled to each of the first and second carriers and configured to (1) produce a first oscillatory motion of the first carrier about a first rotational axis and (2) produce a second oscillatory motion of the second carrier, the second oscillatory motion being counter to the first oscillatory motion.

Other embodiments of the present invention include an oral care implement comprising a head portion having a front surface, a plurality of bristle tufts extending from the front surface, a cup member extending from the front surface of the head portion along a first axis, the elastomeric cup member comprising a top surface, a plurality of grooves formed into the top surface, and a plurality of rib members, wherein adjacent ones of the grooves are separated by one of the rib members, each of the rib members extending along a rib axis that extends radially outward from the first axis, and wherein each of the rib members has a thickness that increases with distance from the first axis.

Other embodiments of the present invention include an oral care implement comprising a head portion having a front surface, a plurality of bristle tufts extending from the front surface, a cup member extending from the front surface of the head portion along a first axis, the elastomeric cup member comprising a top surface a plurality of grooves formed into the top surface, each of the grooves extending along a groove axis that extends radially outward from the first axis, wherein the grooves comprising a plurality of first grooves and a plurality of second grooves, and wherein, taken along a reference cylinder about the first axis, each of the first grooves has a first transverse cross-section and each of the second grooves has a second transverse cross-section, the first and second transverse cross-sections being different from one another.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is front perspective view of a head portion of the oral care implement of FIG. 1 comprising an elastomeric cleaning element;

FIG. 4 is a front view of the head portion of the oral care implement of FIG. 1 comprising the elastomeric cleaning element;

DETAILED DESCRIPTION

Figure 1:
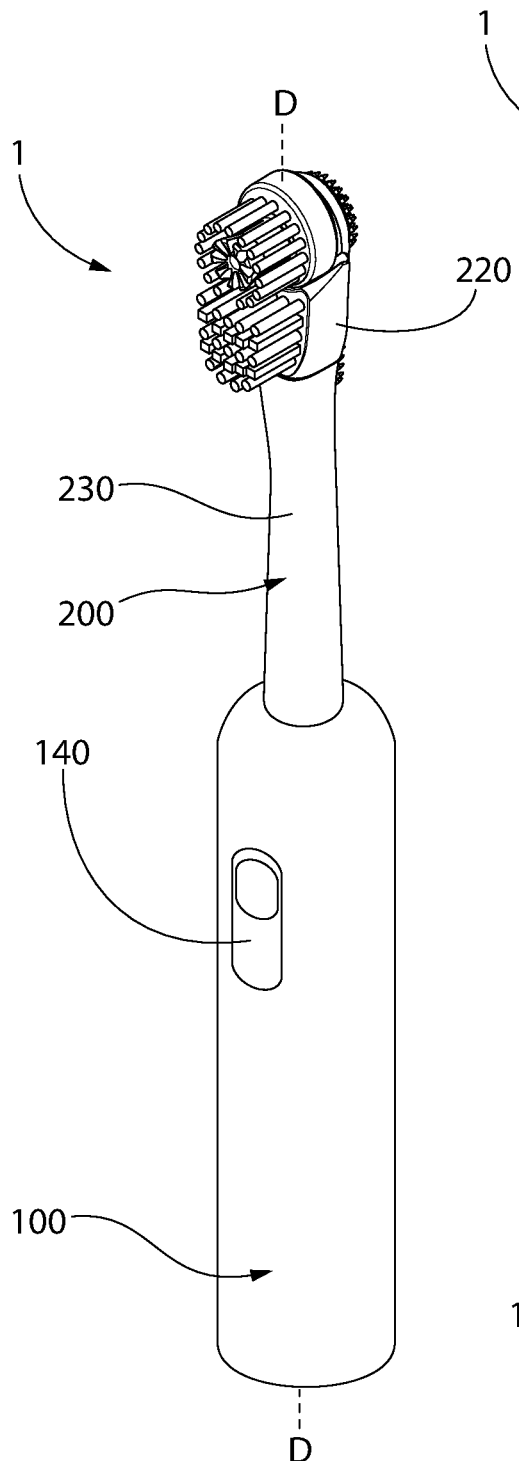
FIG. 1 is front perspective view of a toothbrush comprising an oral care implement in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Figure 2:
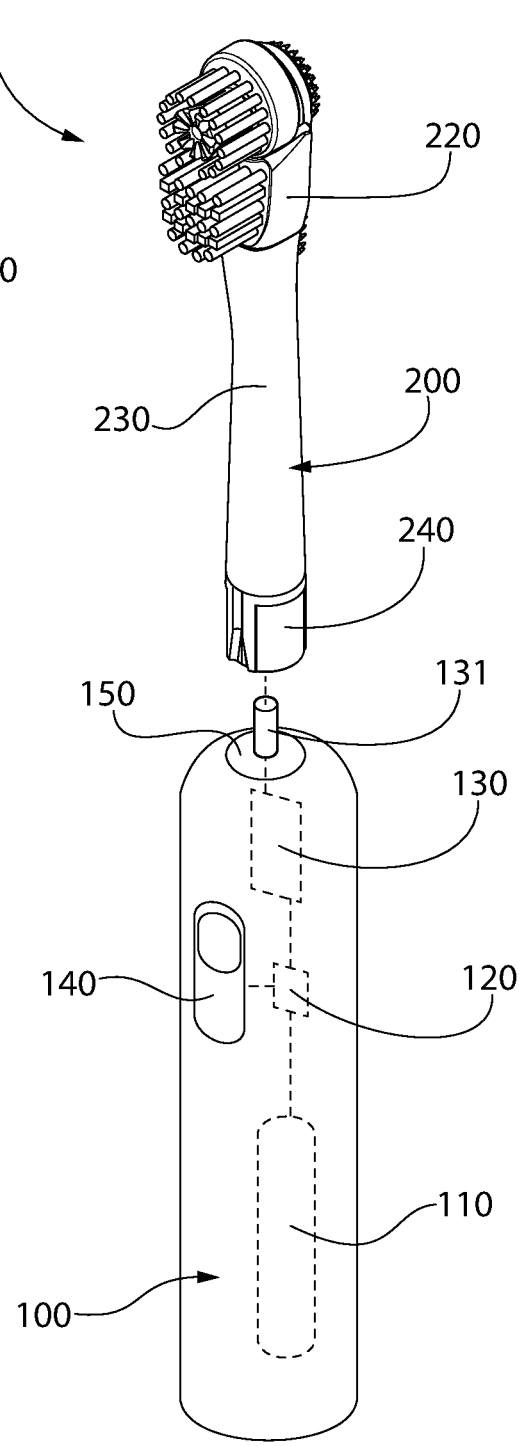
FIG. 2 is front perspective view of a toothbrush comprising an oral care implement in a detached state in accordance with an embodiment of the present invention.
Figure 4B:
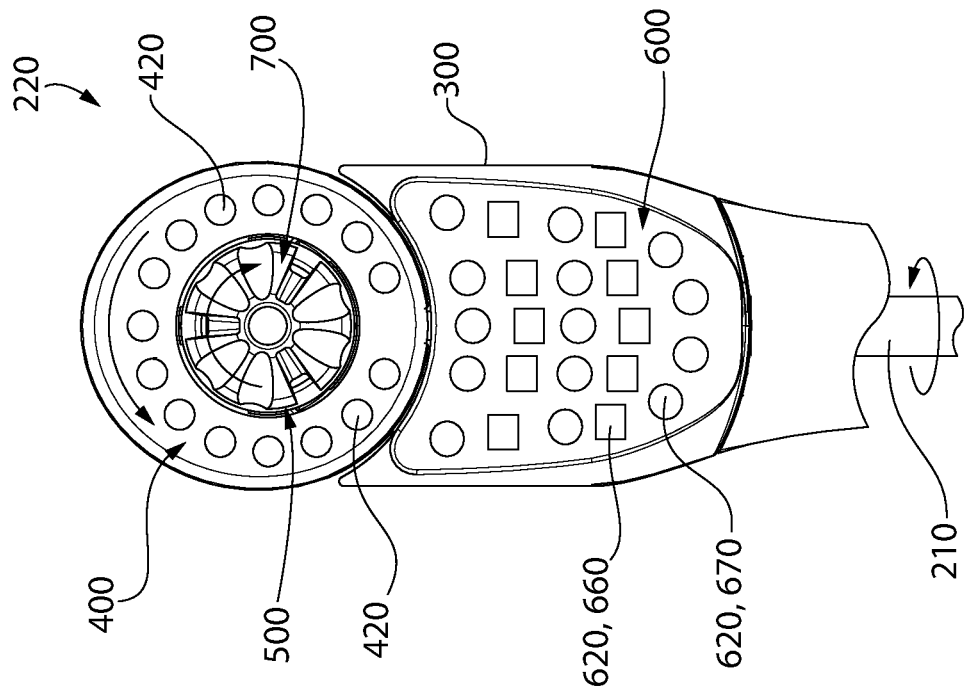
FIG. 4B is a front view of the head portion of the oral care implement of FIG. 1 comprising the elastomeric cleaning element.
Figure 4A:
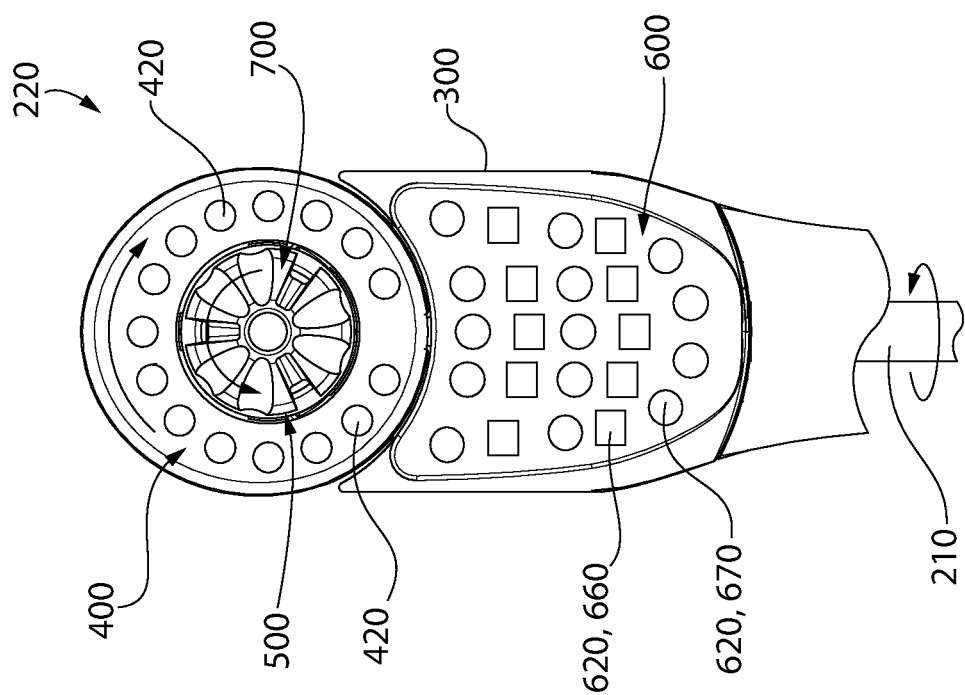
FIG. 4A is a front view of the head portion of the oral care implement of FIG. 1 comprising the elastomeric cleaning element.

Referring to FIGS. 1 and 2, an oral care implement 200 will be described in accordance with an embodiment of the present application. In the exemplified embodiment, a toothbrush 1 may comprise the oral care implement 200, whereby the toothbrush 1 is a powered toothbrush. In other embodiments the oral care implement 200 can take on other forms such as being a manual toothbrush, a tongue scraper, a gum and soft tissue cleanser, a water pick, an interdental device, a tooth polisher, a specially designed ansate implement having cleaning elements, or any other type of implement that is commonly used for oral care.

The toothbrush 1 generally comprises a handle 100 and an oral care implement 200 that are disposed along a longitudinal axis D-D. The handle 100 is an elongated structure that provides the mechanism by which the user can hold and manipulate the toothbrush 1 during use. In the exemplified embodiment, the handle 100 is generically depicted having various contours for user comfort. Of course, the invention is not to be limited by the specific shape illustrated for the handle 100 in all embodiments and in certain other embodiments the handle 100 can take on a wide variety of shapes, contours, and configurations, none of which are limiting of the present invention unless so specified in the claims.

The handle 100 may be formed of a hard or rigid plastic material, such as for example without limitation polymers and copolymers of ethylene, propylene, butadiene, vinyl compounds, and polyesters such as polyethylene terephthalate. The handle 100 may also include a grip that is formed of a resilient/elastomeric material, such as a thermoplastic elastomer. Such a grip may be molded over a portion of the handle 100 that is typically gripped by a user's thumb and forefinger during use. Furthermore, it should be appreciated that additional regions of the handle 100 can be overmolded with the resilient/elastomeric material to enhance the gripability of the handle 100 during use. For example, portions of the handle 100 that are typically gripped by a user's palm during use may be overmolded with a thermoplastic elastomer or other resilient material to further increase comfort to a user. U.S. Pat. No. 7,458,125, which discloses gripping features on an oral care implement handle, is incorporated herein by reference in its entirety. Furthermore, materials other than those noted above can be used to form the handle 100, including metal, wood, or any other desired material that has sufficient structural rigidity to permit a user to grip the handle 100 and manipulate the toothbrush 1 during toothbrushing.

The handle 100 may comprise a power source 110, a CPU 120, and a motor 130 that includes a drive shaft 131. The handle 100 may further comprise an interface 140 for the user to activate the motor 130 via the CPU 120 to rotate the drive shaft 131 during operation of the toothbrush 1, as discussed further herein. As shown in FIG. 1, the oral care implement 200 may be detachable coupled to the handle 100 to form the toothbrush 1 in an assembled state. As shown in FIG. 2, the oral care implement 200 may be detached from the handle 100 to form the toothbrush 1 in a dissembled state.

The oral care implement 200 may further comprise an attachment portion 240 that may be configured to detachably couple the oral care implement 200 to the handle 100 at a receiving portion 150 on the handle 100. When the receiving portion 150 of the handle 100 and the attachment portion 240 of the oral care implement 200 are detachably coupled together, the toothbrush 1 is in the assembled state—as shown in FIG. 1. When the attachment portion 240 and the receiving portion 150 may be detachably coupled together by snap fit, twist-fit, or any other suitable attachment means.

Additionally, the oral care implement 200 may be permanently coupled to the handle 100 by any suitable technique known in the art, including without limitation thermal or ultrasonic welding, a tight-fit assembly, a coupling sleeve, threaded engagement, adhesion, or fasteners. Thus, oral care implement 200—as head portion 220, in particular—may, in certain embodiments, be formed of any of the rigid plastic materials described above as being used for forming the handle 100, although the invention is not to be so limited in all embodiments and other materials that are commonly used during toothbrush head manufacture may also be used.

Referring now to FIGS. 1-4 and 5, the oral care implement 200 comprises a head portion 220 and a neck portion 230. The head portion 220 comprises a front surface 221 opposite a rear surface 222. The head portion 220 may further comprise a body 300, a first carrier 400 and a second carrier 500. According to some embodiments, the head portion 220 may further comprise a third carrier 600. The head portion 220 may have a transverse width $W_H$ as measured by the width of the body 300 in a direction that is normal to the longitudinal axis D-D.

As demonstrated in FIGS. 4, 4A, 4B, 19A, and 19B, the first carrier 400 may comprise a front surface 410, a rear surface 411, and a first tooth cleaning element. The front surface 211 of the heat portion 220 may comprise the front surface 410 of the first carrier 400. The first tooth cleaning element of the first carrier 400 may comprise a first plurality of bristle tufts 420 that extend from the first carrier 400. The first plurality of bristle tufts 420 may extend outward from the front surface 410 of the first carrier 400. The first plurality of bristle tufts 420 may be positioned on the first carrier 400 such that the first plurality of bristle tufts 420 extend from the front surface 221 of the head portion 220 of the oral care implement 200.

Figure 20:
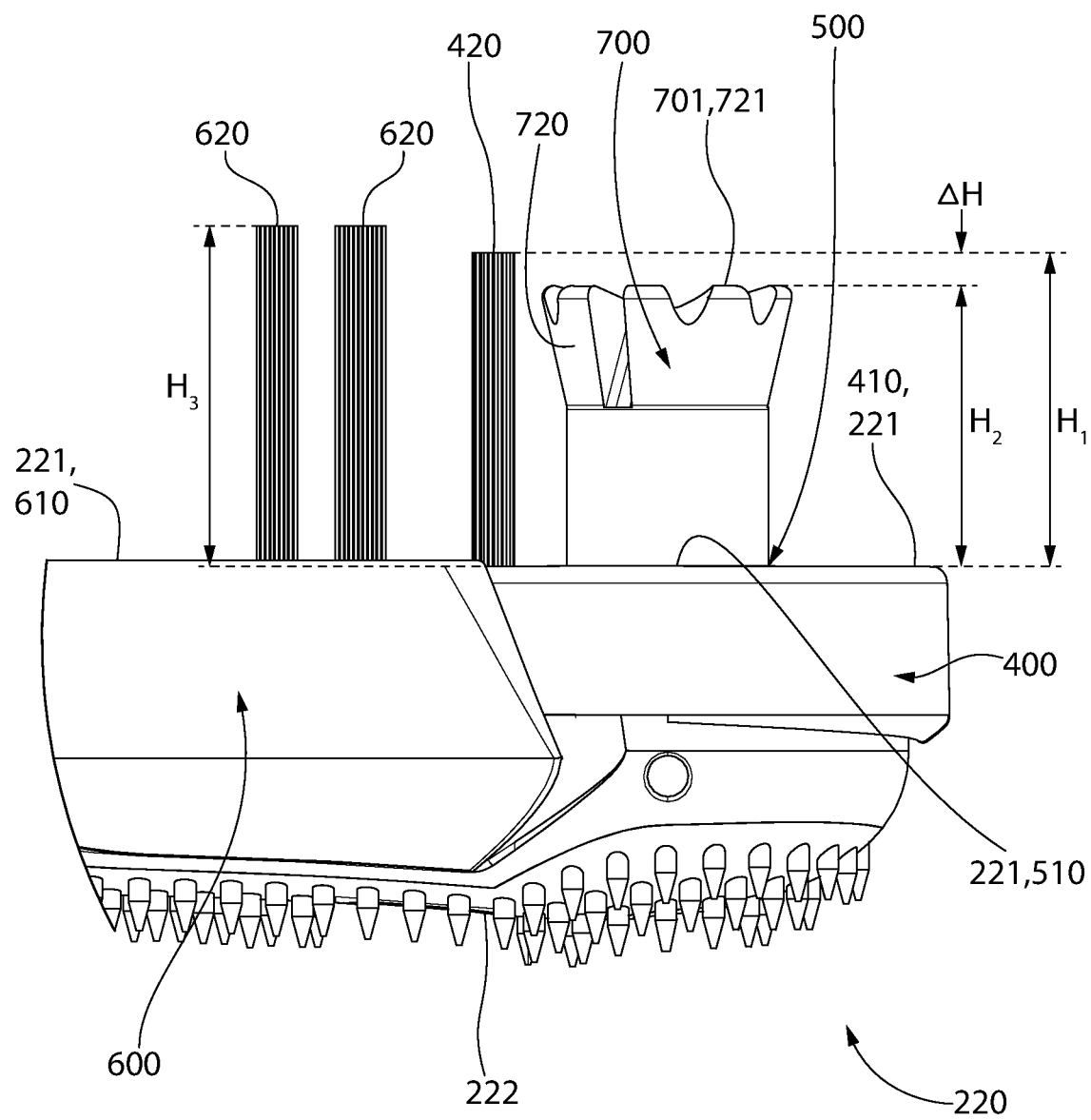
FIG. 20 is a side view of the head portion of the oral care implement of FIG. 1 comprising the elastomeric cleaning element.

As demonstrated in FIG. 20, the first tooth cleaning element of the first carrier 400 may extend outward to a first height $H_1$ as measured from the front surface 410 of the first carrier 400. The first height $H_1$ may be the height of the bristle tufts 420 of the first carrier.

In the exemplified embodiment, a plurality of cleaning elements (in this case bristle tufts 420) are coupled to the head portion 220 and extend from the front surface 221 of the head portion 220. The cleaning elements may be coupled to the head 220 in any manner known in the art, including staples, in-mold tufting, anchor-free tufting (AFT), or a modified AFT known in the art as AMR. It should be appreciated that any of the aforementioned techniques and others may be used in other embodiments. The cleaning elements may be referred to herein in different parts of this disclosure as tooth cleaning elements or bristles. In certain embodiments, the head portion 220 may have a soft tissue cleanser formed of an elastomeric material or the like positioned on its rear surface 222.

The invention is not to be limited by the structure, pattern, orientation, and material of the cleaning elements on the head portion 220 in all embodiments. Furthermore, where it does not conflict with the other disclosure provided herein or the claims, it should be appreciated that the term "cleaning elements" may be used in a generic sense to refer to any structure that can be used to clean, polish, or wipe the teeth and/or soft oral tissue (e.g. tongue, cheek, gums, etc.) through relative surface contact. Common examples of "cleaning elements" include, without limitation, bristle tufts, filament bristles, fiber bristles, nylon bristles, polybutylene terephthalate (PBT) bristles, spiral bristles, rubber bristles, elastomeric protrusions, flexible polymer protrusions, combinations thereof, and/or structures containing such materials or combinations. Furthermore, the cleaning elements can be tapered, end-rounded, spiral, or the like. The term "cleaning elements" is not intended to be limiting of the material of construction of such element unless specifically claimed as such.

The first carrier 400 may be an annular structure. The first carrier 400 may further comprise a central passageway 430. The central passageway 430 may be circular in shape and positioned in centrally within the annular structure of the first carrier 400. The central passageway 430 may extend from the front surface 410 to the rear surface 410 of the first carrier 400. The first plurality of bristle tufts 420 may be arranged in a spaced-apart pattern that circumferentially surrounds the central passageway 430. The spaced-apart pattern of the first plurality of bristle tufts 420 may be such that the bristle tufts 420 are spaced apart equally about the central passageway 430. In other embodiments, at least a portion of the first plurality of bristle tufts 420 may be spaced-apart to form an asymmetric pattern about the central passageway 430.

The second carrier 500 may be disposed within the central passageway 430 of the first carrier 400. As demonstrated in FIGS. 4, 4A, 4B, 19A, and 19B, the second carrier 500 may comprise a front surface 510, a rear surface 511, and a second tooth cleaning element. The front surface 211 of the heat portion 220 may comprise the front surface 510 of the second carrier 500. The second tooth cleaning element may comprise an elastomeric cleaning element 700 that extends from the second carrier 500. The elastomeric cleaning element 700 may extend from the front surface 510 of the second carrier 500. The elastomeric cleaning element 700 may be positioned on the second carrier 500 such that the elastomeric cleaning element 700 extends from the front surface 221 of the head portion 220 of the oral care implement 200.

The elastomeric cleaning element 700 may be formed at least partially, and in some cases entirely, of one or more elastomeric materials. Such an elastomeric material may be referred to herein as a thermoplastic elastomer. Examples of suitable elastomeric materials that may be used for forming a portion or the entirety of the cleaning elements 130 includes styrene block copolymer, thermoplastic olefin (TPO), polysiloxane, silicone, and thermoplastic polyurethane (TPU). In certain embodiments, the elastomeric cleaning element 700 may be formed via an injection molding process if so desired.

As demonstrated in FIG. 20, the second tooth cleaning element of the second carrier 500 may extend outward to a second height $H_2$ as measured from the front surface 510 of the second carrier 500. Specifically, the elastomeric cleaning element 700 may extend outward to a second height $H_2$ as measured from the front surface 510 of the second carrier 500.

The first height $H_1$ of the first cleaning element may be greater than the second height $H_2$ of the second cleaning element. In a particular embodiment, the first height $H_1$ of the bristle tufts 420 of the first carrier 400 may be greater than the second height $H_2$ of the elastomeric cleaning element 700 of the second carrier 500. The difference $\Delta H$ between the first height $H_1$ and the second height $H_2$ may range from a non-zero value up to 2 mm—including all values and sub-ranges there-between. In other embodiments, the first height $H_1$ of the first cleaning element may be equal to the second height $H_2$ of the second cleaning element. In a particular embodiment, the first height $H_1$ of the bristle tufts 420 of the first carrier 400 may be equal to the second height $H_2$ of the elastomeric cleaning element 700 of the second carrier 500.

The elastomeric cleaning element 700 of the second carrier 500 may be positioned within the central passageway 430 formed by the first carrier 400. A clearance space may exist between the first carrier 400 and the second carrier 500 such that the first carrier 400 and the second carrier 500 are free to rotate relative to each other about a second rotational axis B-B—as discussed further herein. The first plurality of bristle tufts 420 of the first carrier 400 may arranged in a spaced-apart pattern that circumferentially surrounds the elastomeric cleaning element 700.

As demonstrated in FIGS. 3 and 4, the elastomeric cleaning element 700 may be the only tooth cleaning element on the second carrier 500. Stated otherwise, the second carrier 500 may have a second tooth cleaning element that is free of bristle tufts. Alternatively, the second carrier 500 may be free of bristle tufts. Although not shown, other embodiments provide that the second tooth cleaning element of the second carrier 500 may further comprise one or more bristle tufts similar to the first plurality of bristle tufts 420 on the first carrier 400.

Figure 5:
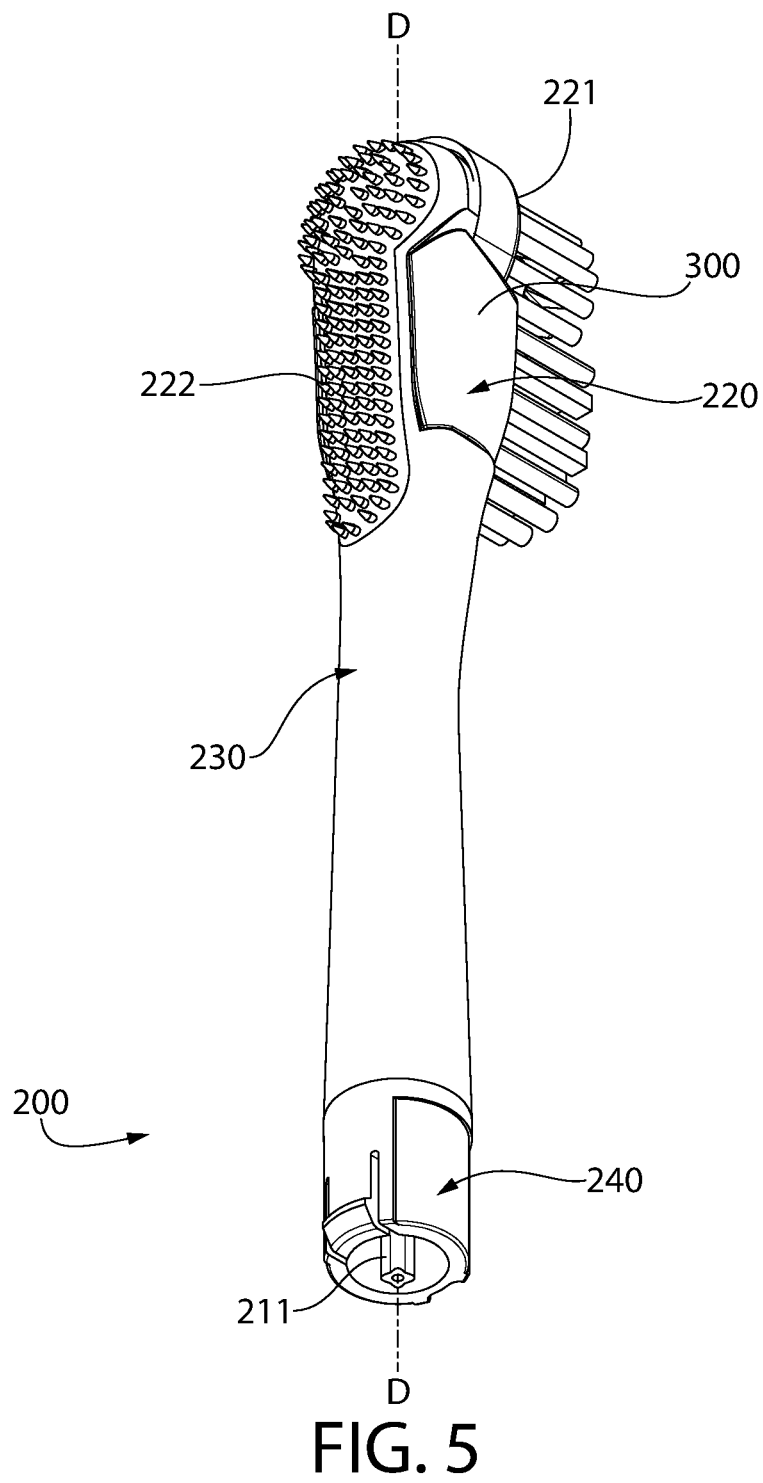
FIG. 5 is a rear perspective view of the oral care implement of FIG. 1.
Figure 18:
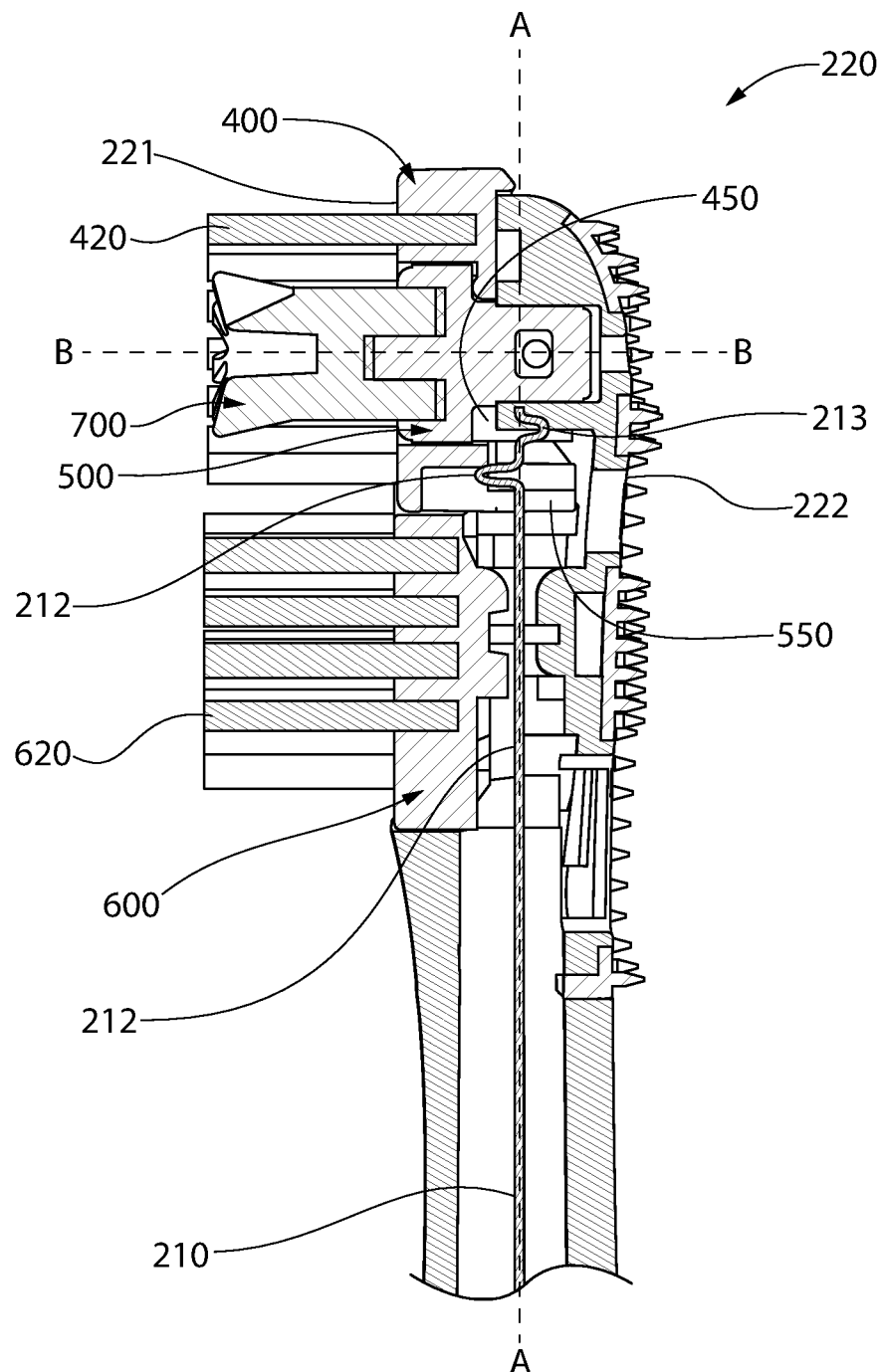
FIG. 18 is a cross-sectional view of the oral care implement of FIGS. 1 and 2.

As shown in FIGS. 5 and 18, the oral care implement may further comprise a drive assembly 210. The drive assembly 210 may comprises a first portion 211 and a second portion 212. The first portion 211 may be configured to operably engage the drive shaft 131 of the motor 130 of the handle 100. When the attachment portion 240 of the oral care implement 200 is detachably coupled to the receiving portion 150 of the handle 100, the first portion 211 of the drive assembly 210 may be operably engaged with the drive shaft 131 of the motor 130 in the handle 100 such that when the motor is engaged and rotating, the drive assembly 210 is rotating about a first rotational axis A-A, as shown in FIGS. 18, 19A, and 19B.

Figure 19A:
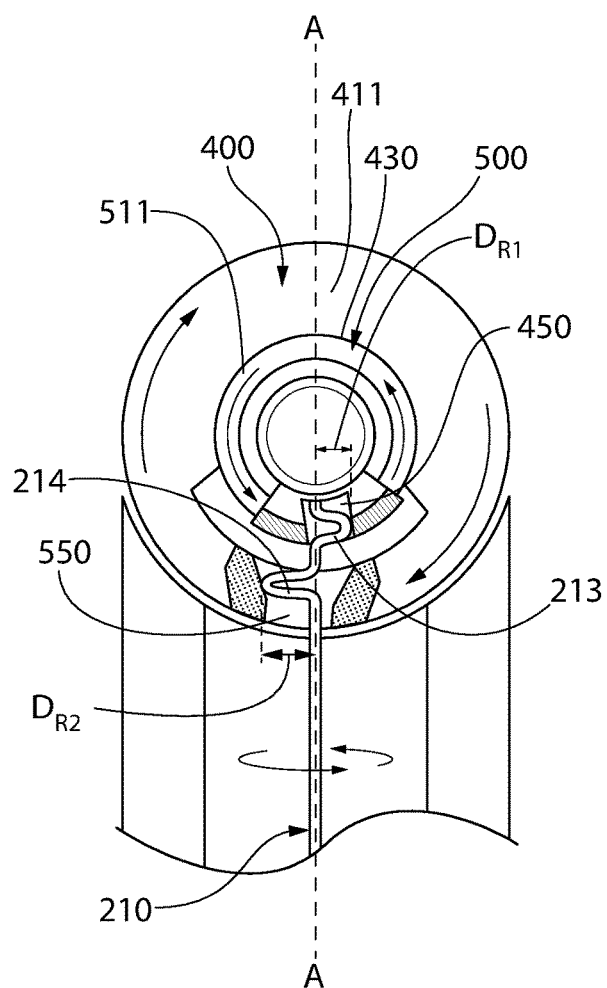
FIGS. 19A and 19B are close-up views of inside of the head portion of the oral care implement of FIGS. 1 and 2.
Figure 19B:
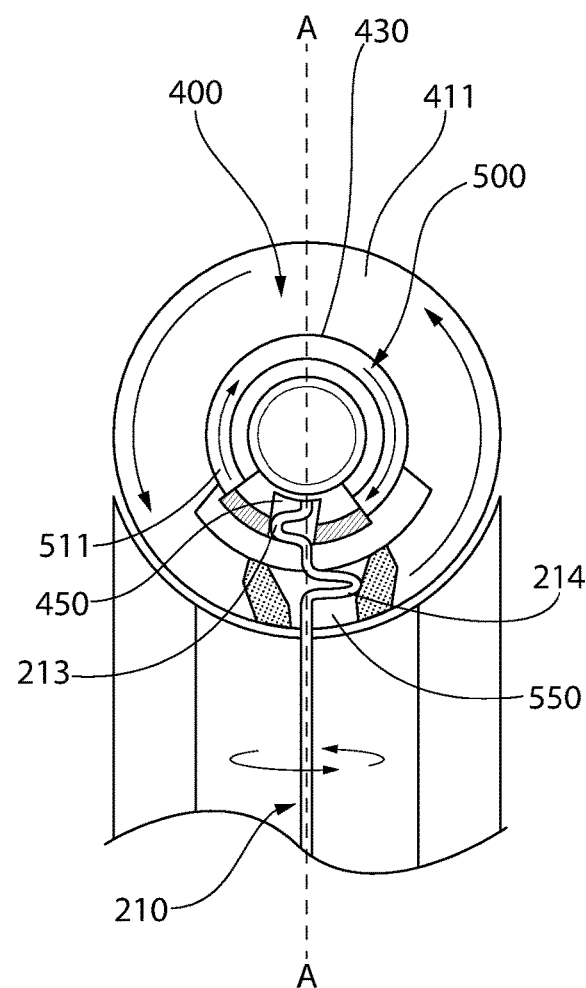

As shown in FIGS. 18, 19A and 19B, the second portion 212 of the drive assembly 210 may be operably coupled to each of the first carrier 400 and the second carrier 500. Specifically, the second portion 212 of the drive assembly 210 may comprise a first eccentric 213 that is configured to operable couple to a first receiving portion 450 of the first carrier 400. The second portion 212 of the drive assembly 210 may further comprise a second eccentric 213 that is configured to operable couple to a second receiving portion 550 of the second carrier 500.

The first eccentric 213 may extend radially from the first rotational axis A-A by a first radial distance $D_{R1}$. The second eccentric 214 may extend radially from the first rotational axis A-A by a second radial distance $D_{R2}$. In some embodiments the first and second radial distances $D_{R1}$, $D_{R2}$ are equal. In other embodiments, the second radial distances $D_{R2}$ is greater than the first radial distance $D_{R1}$.

The first eccentric 213 and the second eccentric 214 may extend from the first rotational axis A-A at an angle greater than 0° and less than 360° (including all sub-ranges and integers there-between), thereby creating an angular offset between the first eccentric 213 and the second eccentric 214 about the first rotational axis A-A. In some embodiments, the angular offset between the first eccentric 213 and the second eccentric 214 may be 180°, thereby causing the first eccentric 213 and the second eccentric 214 to extend in completely opposite directions.

As the drive assembly 210 rotates about the first rotational axis A-A, the angular offset between the first and second eccentrics 213, 214 may produce a first oscillatory motion of the first carrier 400 and a second oscillatory motion of the second carrier 500 about the second rotational axis B-B.

The first oscillatory motion is produced by the interaction between the first eccentric 213 rotating about the first rotational axis A-A, thereby pushing the first receiving portion 450 of the first carrier 400 in a first rotational motion about the second rotational axis B-B (either clockwise or counterclockwise) and then a second rotational motion about the second rotational axis B-B (the opposite of the first rotational motion) as the drive shaft 231 rotates during use of the toothbrush 1. The first oscillatory motion may be viewed relative to the body 300 of the head portion 220, whereby the head portion 300 remains stationary relative to the neck portion 230 of the oral care implement 200.

The second oscillatory motion is produced by the interaction between the second eccentric 214 rotating about the first rotational axis A-A, thereby pushing the second receiving portion 550 of the second carrier 500 in a first rotational motion about the second rotational axis B-B (either clockwise or counterclockwise) and then a second rotational motion about the second rotational axis B-B (the opposite of the first rotational motion) as the drive shaft 231 rotates during use of the toothbrush 1. The first oscillatory motion and the second oscillatory motion being counter-rotational direction to one another for each of the first carrier 400 and the second carrier 500. The second oscillatory motion may also be viewed relative to the body 300 of the head portion 220, whereby the head portion 300 remains stationary relative to the neck portion 230 of the oral care implement 200.

The third carrier 600 may be fixed relative to the body 300 of the head portion 220. Therefore, the first oscillatory motion of the first carrier 400 and the second oscillatory motion of the second carrier 500 may each rotate relative to the fixed third carrier 600 of the head portion 220.

The first rotational motion of the first carrier 400 about the second rotational axis B-B (either clockwise or counter-clockwise) is opposite to the first rotational motion of the second carrier 500 about the second rotational axis B-B—as shown in FIGS. 4A, 4B, 19A, and 19B. Stated otherwise, a single rotation of the drive shaft 231 may cause two separate counter oscillator motions on the head portion 220 of the oral care implement 200 in the form of the first rotational motion of the first carrier 400 about the first rotational motion of the second carrier 500 or the second rotational motion of the first carrier 400 about the second rotational motion of the second carrier 500.

Additionally, depending on the first radial distance $D_{R1}$ of the first eccentric 213 and the second radial distance $D_{R2}$ of the second eccentric 214, the first and second rotational motion of the first carrier 400 may oscillate about the second rotational axis B-B as the same or different circumferential speeds as the first and second rotational motion of the second carrier 500 about the second rotational axis B-B. Depending on the first radial distance $D_{R1}$ of the first eccentric 213 and the second radial distance $D_{R2}$ of the second eccentric 214, the oscillation amplitude of the first carrier 400 may be the same or different than the oscillation amplitude of the second carrier 500 about the second rotational axis B-B—as discussed further herein.

The third carrier 600 may comprise a front surface 610 and plurality of tooth cleaning elements 620 that extend from the third carrier 600. The plurality of tooth cleaning elements 620 may extend outward from the front surface 610 of the third carrier 600. The plurality of tooth cleaning elements 620 may be positioned on the third carrier 600 such that the plurality of tooth cleaning elements 620 extend outward from the front surface 221 of the head portion 220 of the oral care implement 200.

The plurality of tooth cleaning elements 620 may comprise a first plurality of rows of bristle tufts 660 having a polygon transverse cross-section—whereby the polygon has a number of sides ranging from 3 to 10—e.g., triangle, square, rectangle, pentagon, hexagon, heptagon, octagon, etc. In a preferred embodiment, at least some of the tufts in the first plurality of rows of bristle tufts 660 have a square transverse cross-section. The plurality of tooth cleaning elements 620 may comprise a second plurality of rows of bristle tufts 670 having an ellipse transverse cross-section—e.g., symmetrical oval, asymmetrical oval, circle, etc. In a preferred embodiment, at least some of the tufts in the second plurality of rows of bristle tufts 670 have a circular transverse cross-section.

As shown in FIGS. 3 and 4, the first plurality of rows of bristle tufts 660 and the second plurality of rows of bristle tufts 670 may be arranged in an alternating pattern. The first plurality of rows of bristle tufts 660 and the second plurality of rows of bristle tufts 670 may have the same number of tufts. Alternatively, the first plurality of rows of bristle tufts 660 and the second plurality of rows of bristle tufts 670 may have a different number of tufts.

Referring now to FIGS. 3, 4, 6, and 7, the first carrier 400 of the head portion 220 of the oral care implement 200 includes the elastomeric cleaning element 700. The elastomeric cleaning element 700 may comprises a top surface 701 opposite a bottom surface 702 and side walls extending there-between 703. The elastomeric cleaning element 700 may generally be cylindrical and extend along a first axis C-C—whereby the elastomeric cleaning element 700 has a first diameter $D_1$. The first diameter $D_1$ may be least one half the size of the transverse width $W_H$ of the head portion 220 of the oral implement 200. In other embodiments, the first diameter $D_1$ may be greater than one half the size of the transverse width $W_1$ of the head portion 220 of the oral implement 200.

The elastomeric cleaning element 700 may be a cup member 720. The elastomeric element 700 may further comprise a base member 790. The cup member 720 and the base member 790 may be formed together as a single integral piece of elastomeric material whereby the cup member 720 transitions into the base member 790 at an elastomeric transition point 704.

Figure 6:
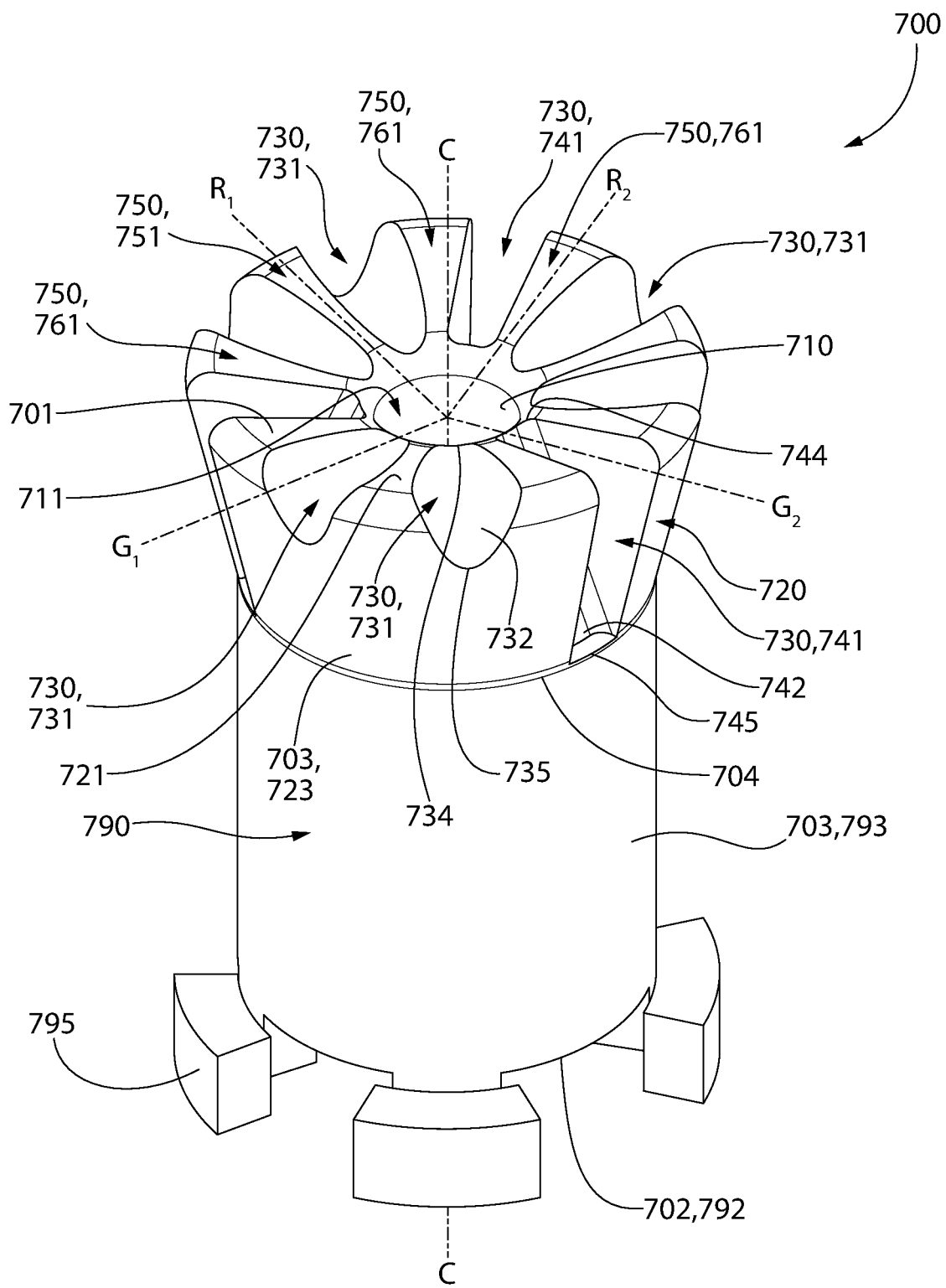
FIG. 6 is perspective of the elastomeric cleaning element of FIG. 3.
Figure 8:
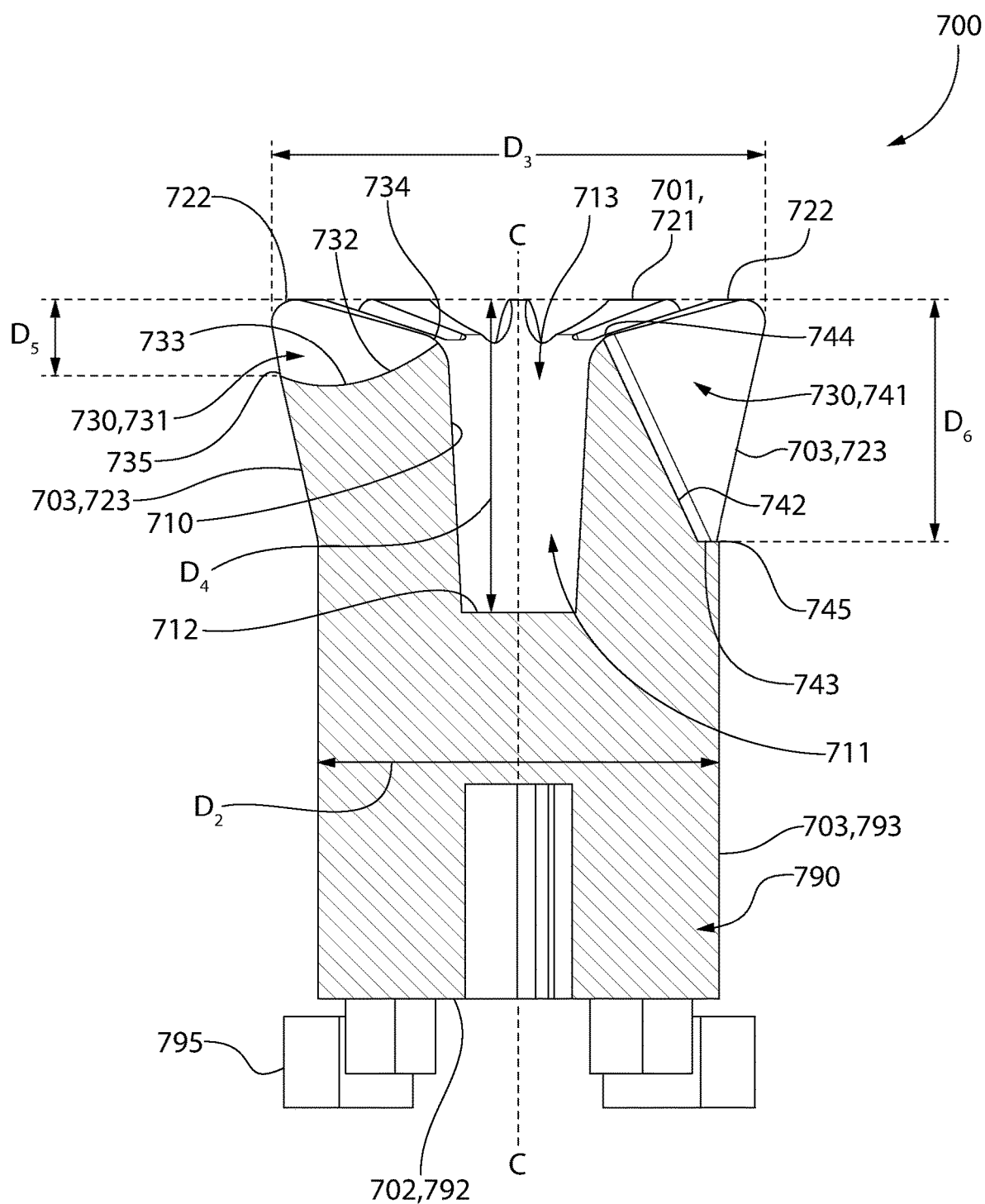
FIG. 8 is a cross-sectional view taken along line VIII-VIII in FIG. 7.

Referring now to FIGS. 6 and 8, the cup member 720 may comprise a top surface 721 and side walls 723. The top surface 701 of the elastomeric cleaning element 700 may comprise the top surface 721 of the cup member 720. The top surface 721 of the cup member 720 comprises a distal surface 722 that is defined as being a portion of the top surface 721 that is the furthest from the bottom surface 702 of the elastomeric cleaning element 700 when view in a direction that is parallel to the first axis C-C. The top surface 721 of the cup member 720 may be sloped upward with distance from the first axis C-C. The top surface 721 of the cup member 720 may form an acute angle with the first axis C-C. The upward slope of the top surface 721 of the cup member may result in the top surface 701 of the elastomeric cleaning element 700 having a concave shape.

The side walls 703 of the elastomeric cleaning element 700 may comprise the side walls 723 of the cup member 720. The cup member 720 extends from the top surface 701 of the elastomeric cleaning element 700 toward the base member 790 along the first axis C-C. The side walls 723 of the cup member 720 extend from the top surface 721 to the elastomeric transition point 704. The side walls 723 of the cup member 720 may extend outwardly at an angle oblique to the first axis C-C such that the cup member 720 has a truncated conical body extending along the first axis C-C. The truncated conical body may have a lower diameter $D_2$ (also referred to as a first diameter $D_2$ of the cup member 720) and an upper diameter $D_3$ (also referred to as a second diameter $D_3$ of the cup member 720). The lower diameter $D_2$ may be the diameter of the elastomeric cleaning element 700 at the elastomeric transition point 704. The elastomeric transition point 704 may be a point where a lower portion of the cup member 720.

The upper diameter $D_3$ may be the diameter of the elastomeric cleaning element 700 at the distal surface 722 of the cup member 720. The upper diameter $D_3$ may be greater than the lower diameter $D_2$ of the cup member 720 resulting in the truncated conical body of the cup member 720. In other embodiments the lower diameter $D_2$ and the upper diameter $D_3$ may be equal resulting in the cup member 720 having a cylindrical body that extends along the first axis C-C.

The cup member 720 may comprise an inner surface 710 that defines a central cavity 711, the central cavity 711 having a cavity floor 712 and an open top end 713. A central cavity depth $D_4$ may be the distance between the cavity floor 712 and the distal surface 722 of the top surface 721 of the cup member 720 when measured in a direction that is parallel to the first axis C-C. The inner surface 710 of the cup member 720 may be continuous. In other embodiments, the inner surface of the cup may comprise openings to form a discontinuous surface—as discussed further herein. The inner surface 710 may extend from the cavity floor 712 toward the distal surface 722 at an angle that is oblique to the first axis C-C. In other embodiments, the inner surface 710 may extend from the cavity floor 712 toward the distal surface 722 in a direction that parallel to the first axis C-C.

The side walls 723 of the cup member 720 and the side walls 793 of the base member 790 may form a continuous smooth surface that makes up the side wall 703 of the elastomeric cleaning element 700. In some embodiments the elastomeric transition point 704 may include an annular line or groove that provides a visual delineation representing the transition between the base member 790 and the cup member 720.

The base member 790 extends from the cup member 720 toward the bottom surface 702 of the elastomeric cleaning element 700 along the first axis C-C. The side walls 793 of the base member 790 extend from the elastomeric transition point 704 to the bottom surface 792 of the base member 790. The base member 790 may comprise a bottom surface 792 and side walls 793. The bottom surface 702 of the elastomeric cleaning element 700 may comprise the bottom surface 792 of the base member 790. The side walls 703 of the elastomeric cleaning element 700 may comprise the side walls 793 of the base member 790.

The base member 790 may extend along the first axis C-C. The base member 790 of the elastomeric cleaning element 700 has side walls 793 extending between the cup member 720 and the bottom surface 702 of the elastomeric cleaning element 700. The side walls 703 of the elastomeric cleaning element 700 may also comprise the side walls 793 of the base member 790. The base member 790 may extend from the cup member 720 to the bottom surface 702 of the elastomeric cleaning element 200.

The base member 790 may comprise a cylindrical body that extends along the first axis C-C. The cylindrical body has a base diameter that is remains constant as measured along the first axis C-C. The base diameter may be substantially equal to the first diameter $D_2$ of the cup member 720. The truncated conical body may have a diameter that increases in size as measured along a direction from the bottom surface 702 to the top surface 701 of the elastomeric cleaning element along the first axis C-C. The truncated conical body of the cup member 720 may have a starting diameter that is substantially equal to the base diameter $D_B$ of the base member 790 and expand outward from the first axis C-C to a top surface diameter $D_{TS}$ when in the direction from the bottom surface 702 to the top surface 701 of the elastomeric cleaning element 700. The top surface diameter $D_{TS}$ may be greater than the base diameter $D_B$. A ratio of the surface diameter $D_{TS}$ to the base diameter $D_B$ may range from about 1:1 to about 5:1—including all ratios and sub-ranges there-between.

Figure 7:
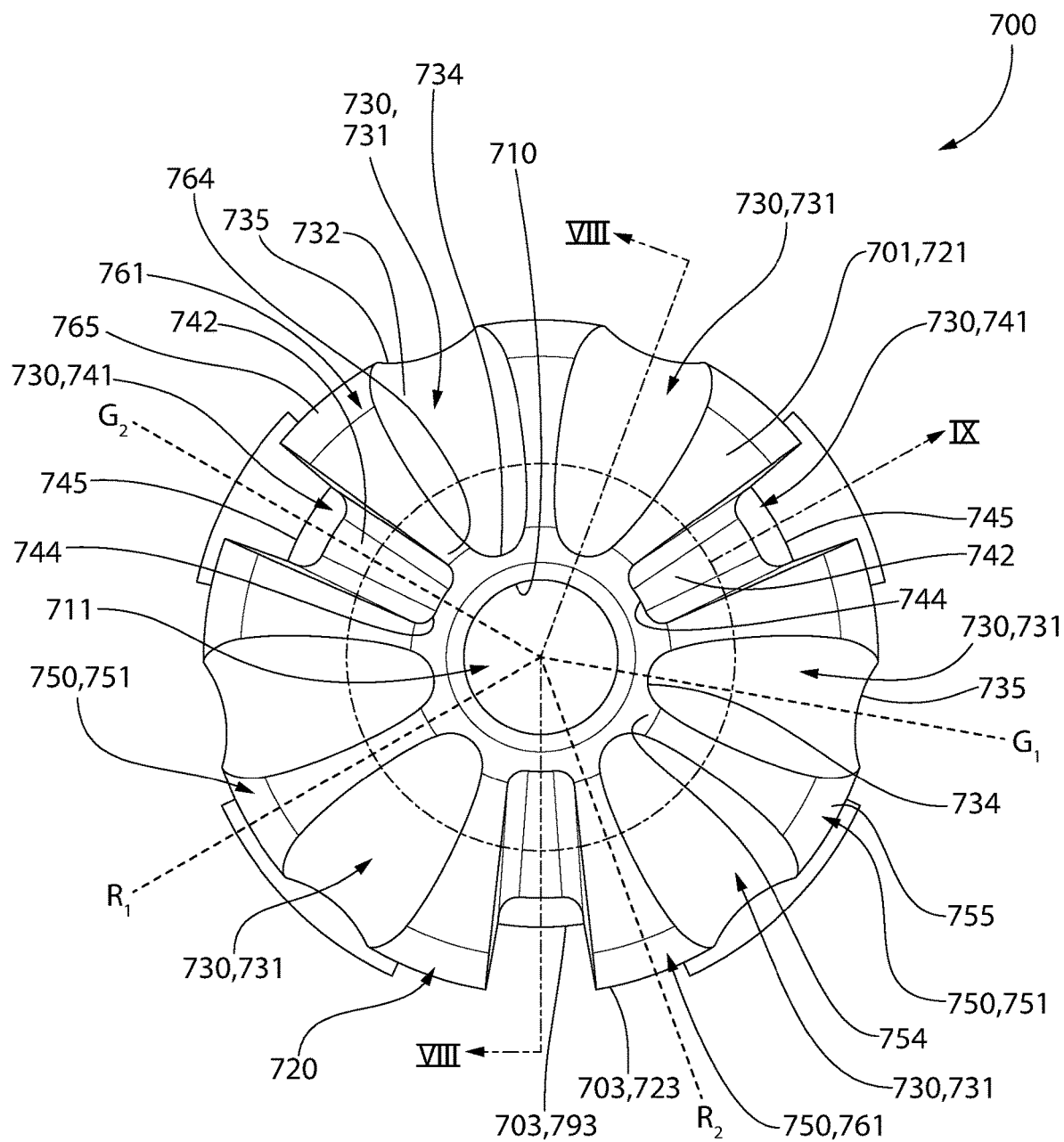
FIG. 7 is top view of the an elastomeric cleaning element of FIG. 6.

Referring now to FIGS. 6-8, the cup member 720 may comprise a plurality of grooves 730 that are formed in the top surface 721 of the cup member 720. The plurality of grooves 730 may be formed in the top surface 701 of the elastomeric cleaning element 700 extending downward into the cup member 720 toward the bottom surface 702 of the elastomeric cleaning element 700. Each of the plurality of grooves 730 may extend along a groove axis $G_1$, $G_2$ that extends radially outward from the first axis C-C—as discussed further herein.

The plurality of grooves 730 may comprise a plurality of first grooves 731. The plurality of grooves 730 may comprise a plurality of second grooves 741. Each of the first grooves 731 may extend along a first groove axis $G_1$ that extends radially outward from the first axis C-C. Each of the second grooves 741 may extend along a second groove axis $G_2$ that extends radially outward from the first axis C-C.

The plurality of first grooves 731 and second grooves 741 may be arranged in a repeating circumferential pattern about the first axis C-C. The repeating circumferential pattern may be such that the first grooves 731 and the second grooves 741 alternate circumferentially about the first axis C-C. The repeating circumferential pattern may be such that multiples of either the first grooves 731 or the second groove 741 are adjacent to each without one of the other second groove 741 or first groove 731 are positioned there-between.

Referring now to FIG. 8, each of the first grooves 731 may comprise a first groove floor 732 and each of the second grooves 741 may comprise a second groove floor 742. The first groove 731 may have a first groove depth that is the distance between the first groove floor 732 and the distal surface 722 of the top surface 721 of the cup member 720 as viewed in a direction that is parallel to the first axis C-C. The second groove 741 may have a second groove depth that is the distance between the second groove floor 742 and the distal surface 722 of the top surface 721 of the cup member 720 as viewed in a direction that is parallel to the first axis C-C.

The first groove depth of the first groove 731 may increase with distance from the first axis C-C. The second groove depth of the second groove 741 may increase with distance from the first axis C-C. At a single radial distance from the first axis C-C, the second groove depth of the first groove 731 may be greater than the first groove depth of the second groove 741 at equal radially distances from the first axis C-C. In other embodiments, at a single radial distance from the first axis-C-C, the first and second groove depths may be equal.

The first groove floor 732 may have a longitudinally concave shape, whereby the longitudinal concave shape of the first groove 732 is oriented along the first groove axis $G_1$. Each of the first grooves 731 may have a first maximum depth $D_5$ as measured from the distal surface 722 of the top surface 721 of the cup member 720 to a deepest point 733 of the first groove floor 732 in a direction that is parallel to the first axis C-C.

Each of the first groove floors 732 may extend radially between a starting point 734 and an ending point 735, whereby the starting point 734 is closest to the first axis C-C and the ending point 735 is farthest from the first axis C-C along the first groove axis $G_1$. The starting point 734 may be adjacent to the inner surface 710 that defines the central cavity 710. The ending point 735 may intersect with the side wall 723 of the cup member 720 such that the concave shape of the first groove 731 forms a first notch of the side wall 723 of the cup member 720. The first notches formed by the first groove 731 may result in a discontinuous upper portion of the side wall 723 that extends about the first axis C-C.

The starting point 734 of the first groove 731 may be located between the deepest point 733 of the first groove 731 and the distal surface 722 of the top surface 721 of the cup member 720 as measured along a direction that is parallel to the first axis C-C. The first groove floor 732 may have a longitudinally concave shape such that the ending point 735 of the first groove 731 may be located between the deepest point 733 of the first groove 731 and the distal surface 722 of the top surface 721 of the cup member 720 as measured along a direction that is parallel to the first axis C-C.

The second groove floor 742 may have a longitudinally U-shape, whereby the longitudinal U-shape of the second groove 742 is oriented along the second groove axis $G_1$. The second groove floor 742 may slope downward with distance from the first axis C-C. Each of the second grooves 741 may have a second maximum depth $D_6$ as measured from the distal surface 722 of the top surface 721 of the cup member 720 to a deepest point 743 of the second groove floor 742 in a direction parallel to the first axis C-C. The second maximum $D_6$ may be greater than the first maximum depth $D_5$.

Each of the second groove floors 742 may extend radially between a starting point 744 and an ending point 745, whereby the starting point 744 is closest to the first axis C-C and the ending point 745 is farthest from the first axis C-C along the second groove axis $G_2$. The starting point 744 may be adjacent to the inner surface 710 that defines the central cavity 710. The ending point 745 may intersect with the side wall 723 of the cup member 720 such that the U-shape of the second groove 741 forms a second notch of the side wall 723 of the cup member 720.

The starting point 744 of the second groove 741 may be located between the deepest point 743 of the second groove 741 and the distal surface 722 of the top surface 721 of the cup member 720 as measured along a direction that is parallel to the first axis C-C. The second groove floor 742 may be downwardly sloping such that the ending point 745 of the second groove 741 may be located at the deepest point 743 of the second groove 741 and the distal surface 722 of the top surface 721 of the cup member 720 as measured along a direction that is parallel to the first axis C-C.

The discontinuous upper portion of the side wall 723 may further comprise the second notches formed by the second groove 741. Below the second notches (i.e., between the elastomeric transition point 704 and the ending point 745 of the second grooves 741) the side wall 723 may comprise a continuous lower portion of the side wall 723 that extends about the first axis C-C.

The plurality of first grooves 731 and second grooves 741 that are arranged in a repeating circumferential pattern about the first axis C-C may corresponding create a repeating circumferential pattern of first cut portions and second notches along the side wall 723 of the cup member 720. Specifically, multiples of either the first notch or the second notch may be adjacent to each without one of the other second notch or first notch being positioned there-between.

Additionally, as discussed depending on the first and second rotational motion of the first carrier 400 about the second rotational axis B-B relative to the first and second rotational motion of the second carrier 500, different circumferential speeds and/or amplitudes can be achieved for the first carrier 400 rotating relative to the second carrier 500. As such, the second carrier 500 may rotate relative to the first carrier 400 thereby causing the first and second notches of the cup member 720 to move a different circumferential speed relative to the bristle tufts 420 present on the first carrier 400, thereby providing a superior oral cleaning experience.

Referring now to FIG. 8, the central cavity depth $D_4$ of the central cavity 711 may be greater than the first maximum depth $D_5$ of the first groove 731. The central cavity depth $D_4$ of the central cavity 711 may be equal to the second maximum depth $D_6$ of the second groove 741. The central cavity depth $D_{CC}$ may be greater than the second maximum depth $D_{G2}$ of the second groove 741. The central cavity depth $D_{CC}$ may be equal to the second maximum depth $D_{G2}$ of the second groove 741. The inner wall 710 may form a continuous vertical or substantially vertical wall that isolates the plurality of grooves 730 from the central cavity 711 in the cup member 720.

Referring now to FIG. 7, the ending point 735 of the first groove 731 may be positioned at a radial distance that is greater than the radial distance of the ending point 745 of the second groove 741 from the first axis C-C. In other embodiments, the ending point 735 of the first groove 731 is positioned at a radial distance that is equal to the radial distance of the ending point 745 of the second groove 741 from the first axis C-C. The starting point 734 of the first groove 731 may be positioned at a radial distance that is equal to the radial distance of the starting point 744 of the second groove 741 from the first axis C-C. In other embodiments, the starting point 734 of the first groove 731 is positioned at a radial distance that is not equal to the radial distance of the starting point 744 of the second groove 741 from the first axis C-C.

Figure 9:
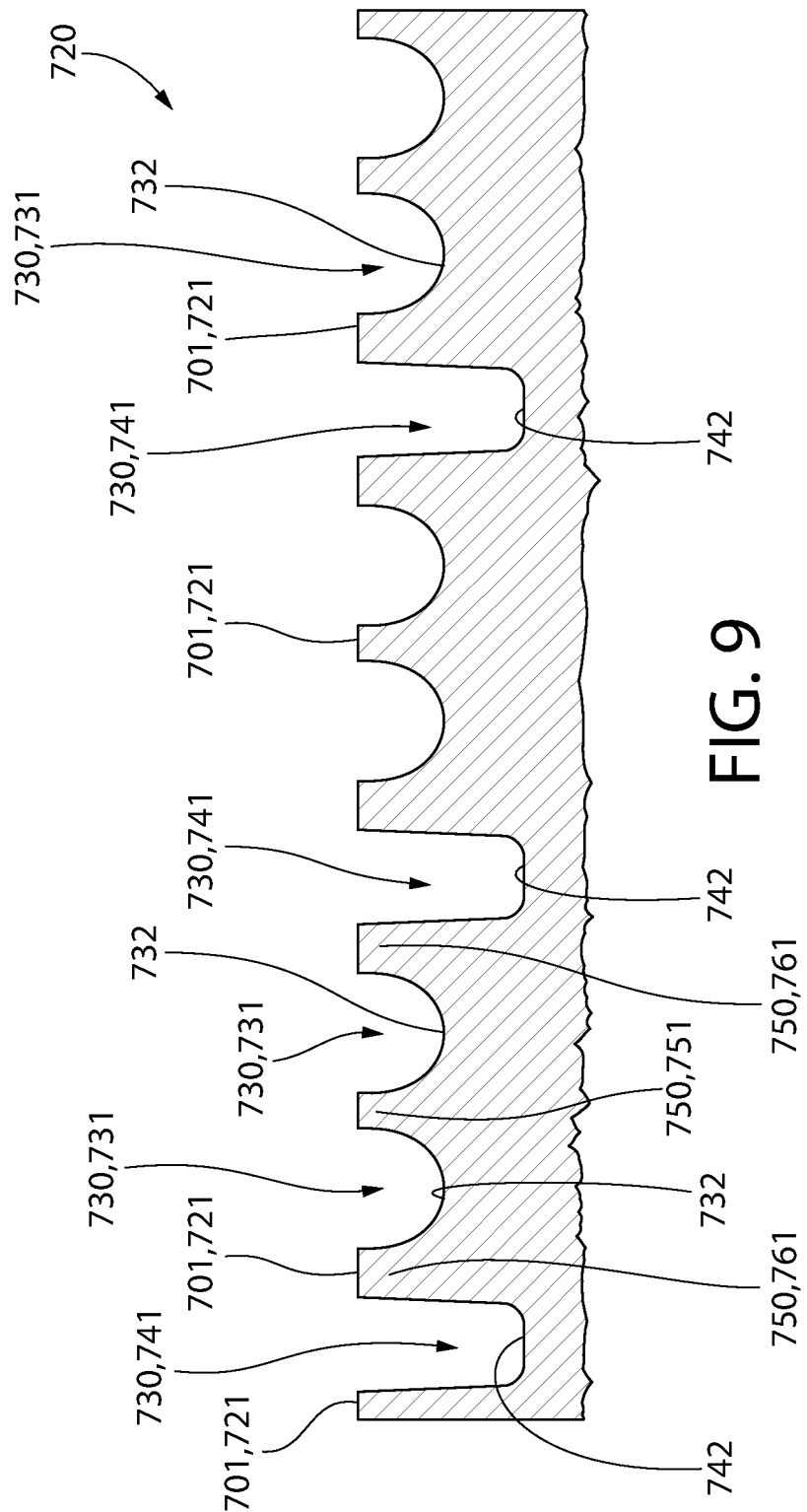
FIG. 9 is a cross-sectional view taken along line IX in FIG. 7.

Referring now to FIGS. 8 and 9, when taken along a reference cylinder (IX of FIG. 7) about the first axis C-C, each of the plurality of first grooves 731 may have a first transverse cross-section and each of the plurality of second grooves 741 may have a second transverse cross-section. The first transverse cross-section and the second transverse cross-section may be different from one another. The first transverse cross-section of the first groove 731 may have a first shape and the second transverse cross-section of the second groove 741 may have a second shape. The first shape may be different from the second shape. The first shape may be a portion of a polygon or a ellipses. The second shape may be a portion of a polygon or a ellipses. In a preferred embodiment, the first shape forms a portion of an ellipses—preferably a concave curve that faces the same direction as the top surface 721 of the cup member 720. In a preferred embodiment, the second shape forms a U.

The elastomeric cleaning element 700 may comprise a plurality of rib members 740. Adjacent ones of the grooves 730 are separated by one of the rib members 740. The plurality of ribs members 750 extend along a rib axis $R_1$, $R_2$ that extends radially outward from the first axis C-C—as discussed further herein. Each of the rib members 750 has a thickness that increases when measured along the rib axis $R_1$, $R_2$ as the distance from the first axis C-C increases.

The plurality of rib members 750 may comprise a plurality of first rib members 751. The plurality of rib members 750 may comprise a plurality of second rib members 761. Each of the first rib members 751 may extend along a first rib axis $R_1$ and each of the second rib members 761 may extend along a second rib axis $R_2$—whereby the first and second rib axis's $R_1$, $R_2$ extend radially outward from the first axis C-C.

The plurality of first rib members 751 and second rib members 761 may be arranged in a repeating circumferential pattern about the first axis C-C. The repeating circumferential pattern may be such that the first rib members 751 and the second rib members 761 alternate circumferentially about the first axis C-C. The repeating circumferential pattern may be such that multiples of either the first rib member 751 and/or the second rib members 761 are adjacent to each without the other of the second rib member 761 or the first rib member 751 being positioned there-between. The first rib member 751 may be positioned between two adjacent first grooves 731. The second rib member 761 may be positioned between the first groove 731.

Each of the first rib members 751 may extend radially between a starting point 754 and an ending point 755, whereby the starting point 754 is closest to the first axis C-C and the ending point 755 is farthest from the first axis C-C along the first rib axis $R_1$. The starting point 754 may be adjacent to the inner surface 710 that defines the central cavity 710. Each of the second rib members 761 may extend radially between a starting point 764 and an ending point 765, whereby the starting point 764 is closest to the first axis C-C and the ending point 765 is farthest from the first axis C-C along the second rib axis $R_2$. The starting point 764 may be adjacent to the inner surface 710 that defines the central cavity 710.

The first rib members 751 may extend out radially from the first axis C-C such that the first rib member 751 becomes wider with distance. The first rib members 751 may become wider symmetrically with distance from the first axis C-C. The second rib members 761 may extend out radially from the first axis C-C such that the second rib members 761 becomes wider with distance. The second rib members 761 may become wider asymmetrically with distance from the first axis C-C. The ending point 755 of the first rib member 751 may extend to the distal surface 722 of the cup member 720. The ending point 765 of the second rib member 761 may extend to the distal surface 722 of the cup member 720.

Each of the first rib members 751 may extend radially from the first axis C-C such that the ending point 755 of the first rib member 751 intersect with the side wall 720 of the cup member 720. Each of the second rib members 761 may extend radially from the first axis C-C such that the ending point 765 of the second rib member 761 intersect with a portion of the side wall 720 of the cup member 720. The first notch of the side wall 723 formed by the first groove 731 may be located between adjacent ones of the first rib member 751 and the second rib member 761. The second notch of the side wall 723 formed by the second groove 741 may be located between adjacent second rib members 751.

Referring now to FIGS. 10-13, an elastomeric cleaning element 800 is illustrated in accordance with another embodiment of the present invention. The elastomeric cleaning element 800 is similar to the elastomeric cleaning element 700 except as described herein below. The description of the elastomeric cleaning element 700 generally applies to the elastomeric cleaning element 800 described below except with regard to the differences specifically noted below. A similar numbering scheme will be used for the elastomeric cleaning element 800 as with the elastomeric cleaning element 700 except that the 800-series of numbers will be used.

The elastomeric cleaning element 800 may be a cup member 820. The elastomeric element 800 may further comprise a base member 890. The cup member 820 may comprise a top surface 821 and side walls 823. The cup member 820 may further comprise an annular wall 805 that intersects the top surface 821 and the side walls 823 of the cup member 820. The annular wall 805 may form a continuous surface on the elastomeric cleaning element 800. The annular wall 805 may comprise a distal surface 822 that is defined as being a portion of the top surface 821 that is the furthest from the bottom surface 802 of the elastomeric cleaning element 800 when view in a direction that is parallel to the first axis C-C.

Figure 10:
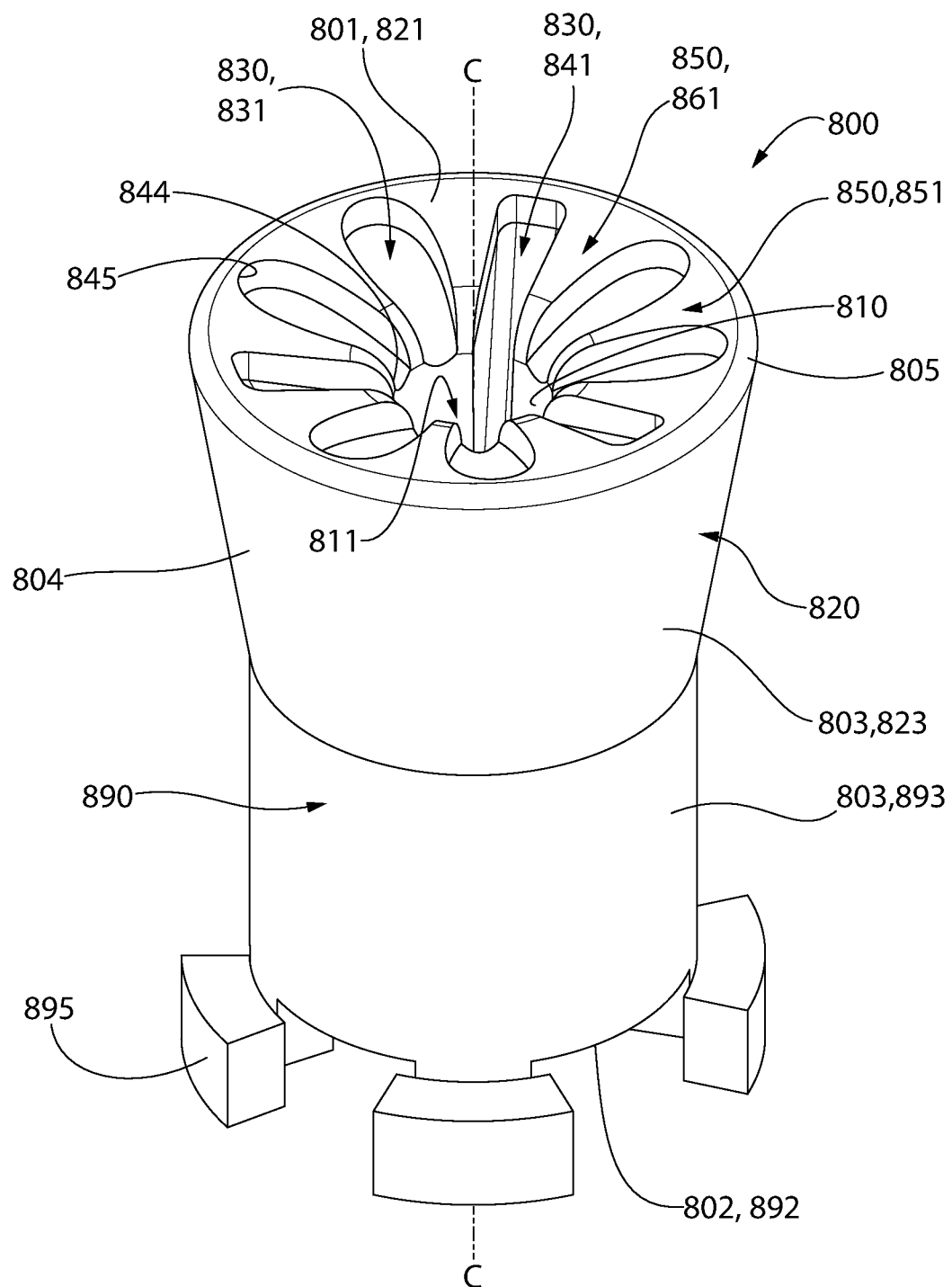
FIG. 10 is perspective of an elastomeric cleaning element according to another embodiment of the present invention.
Figure 11:
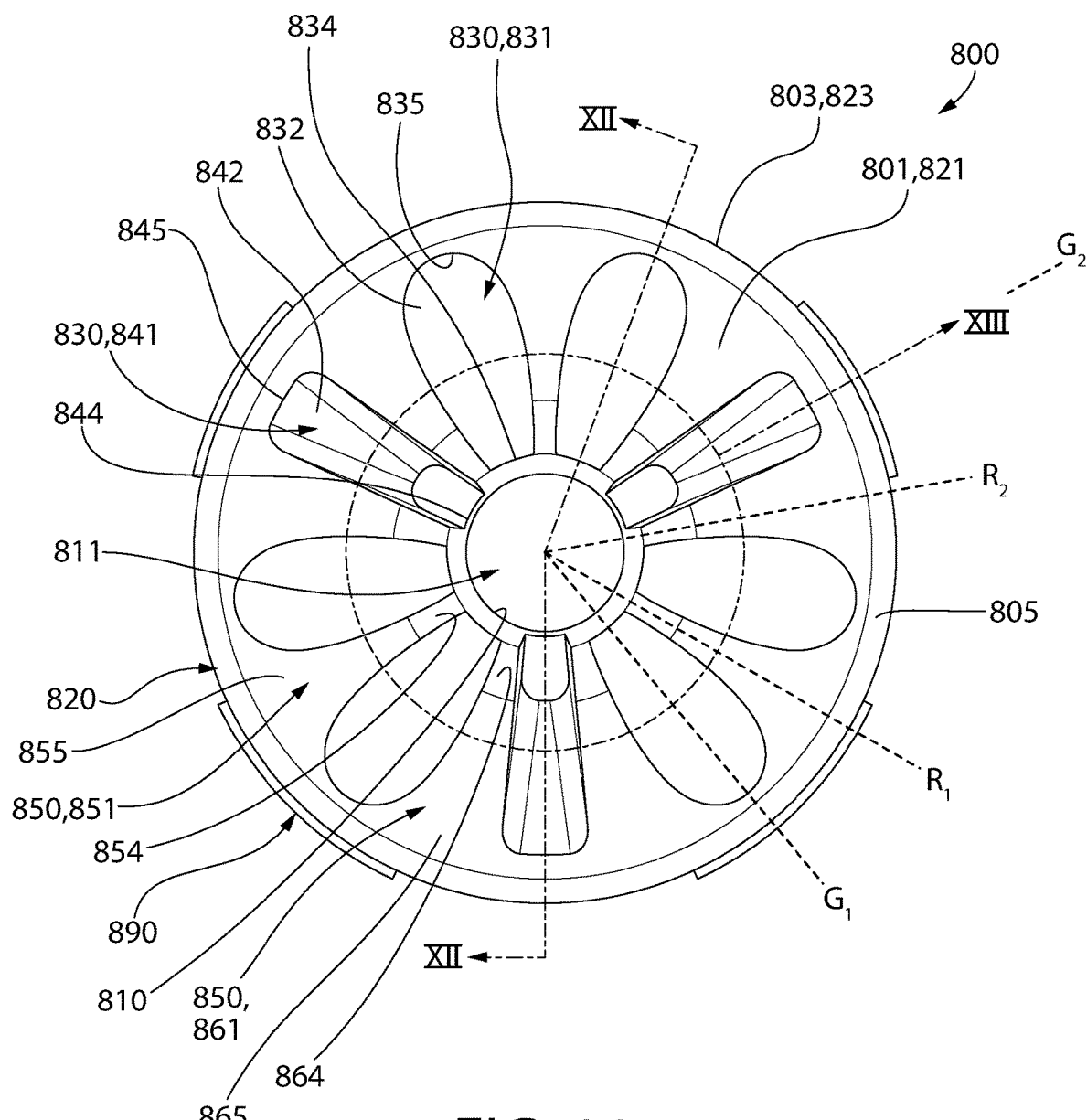
FIG. 11 is top view of the an elastomeric cleaning element of FIG. 10.
Figure 12:
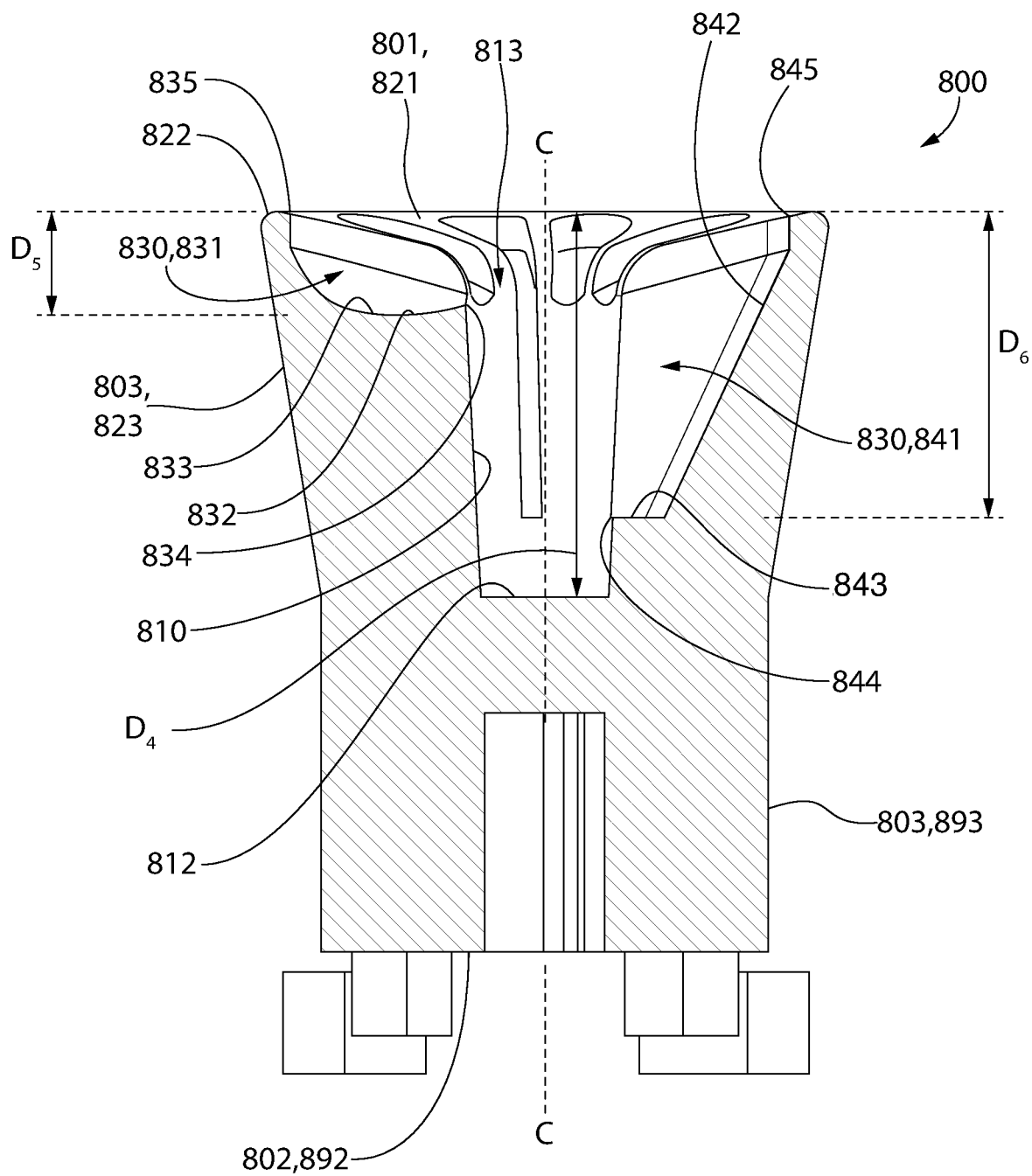
FIG. 12 is a cross-sectional view taken along line XII-XII in FIG. 11.
Figure 13:
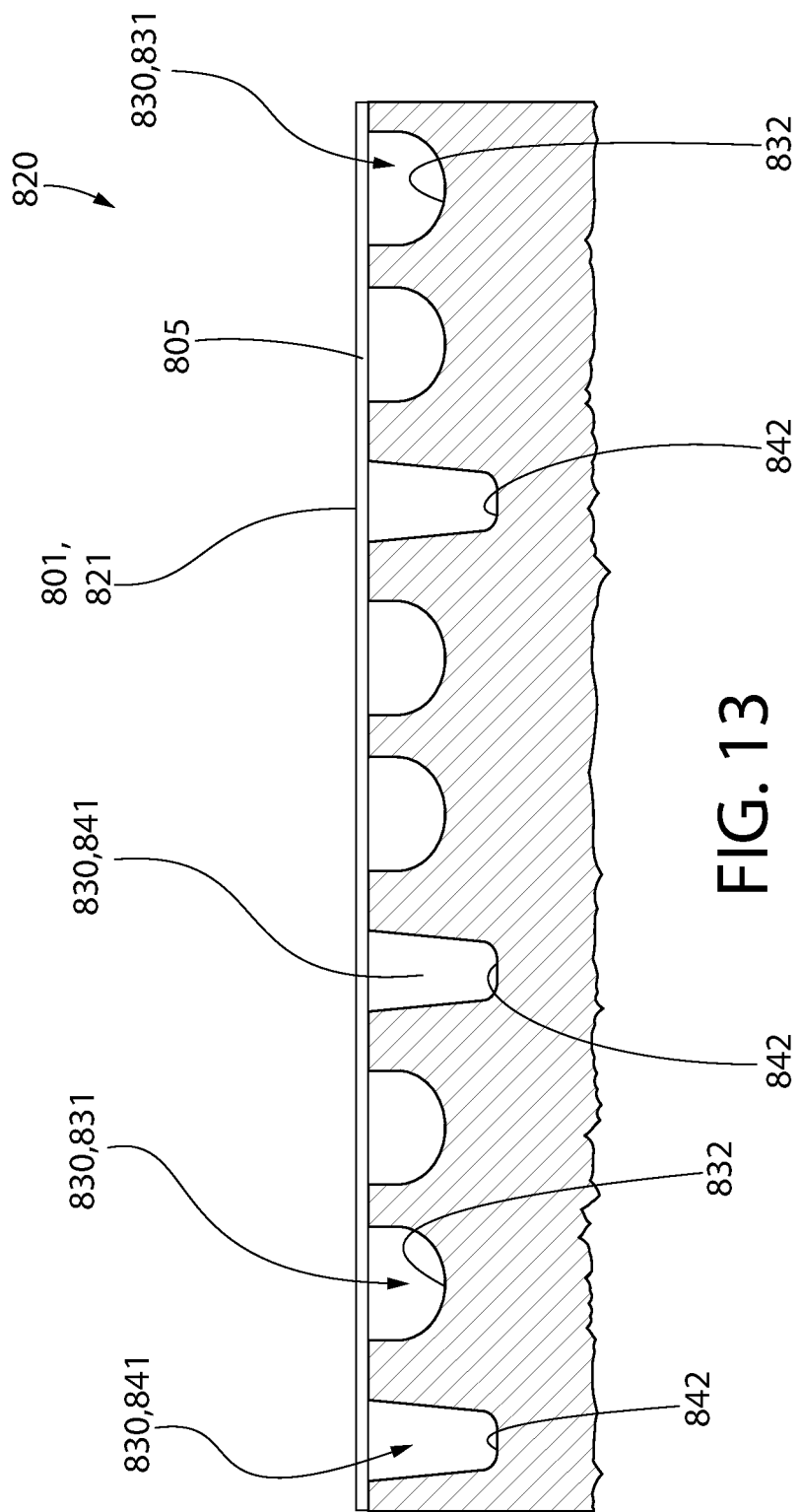
FIG. 13 is a cross-sectional view taken along line XIII in FIG. 11.
Figure 14:
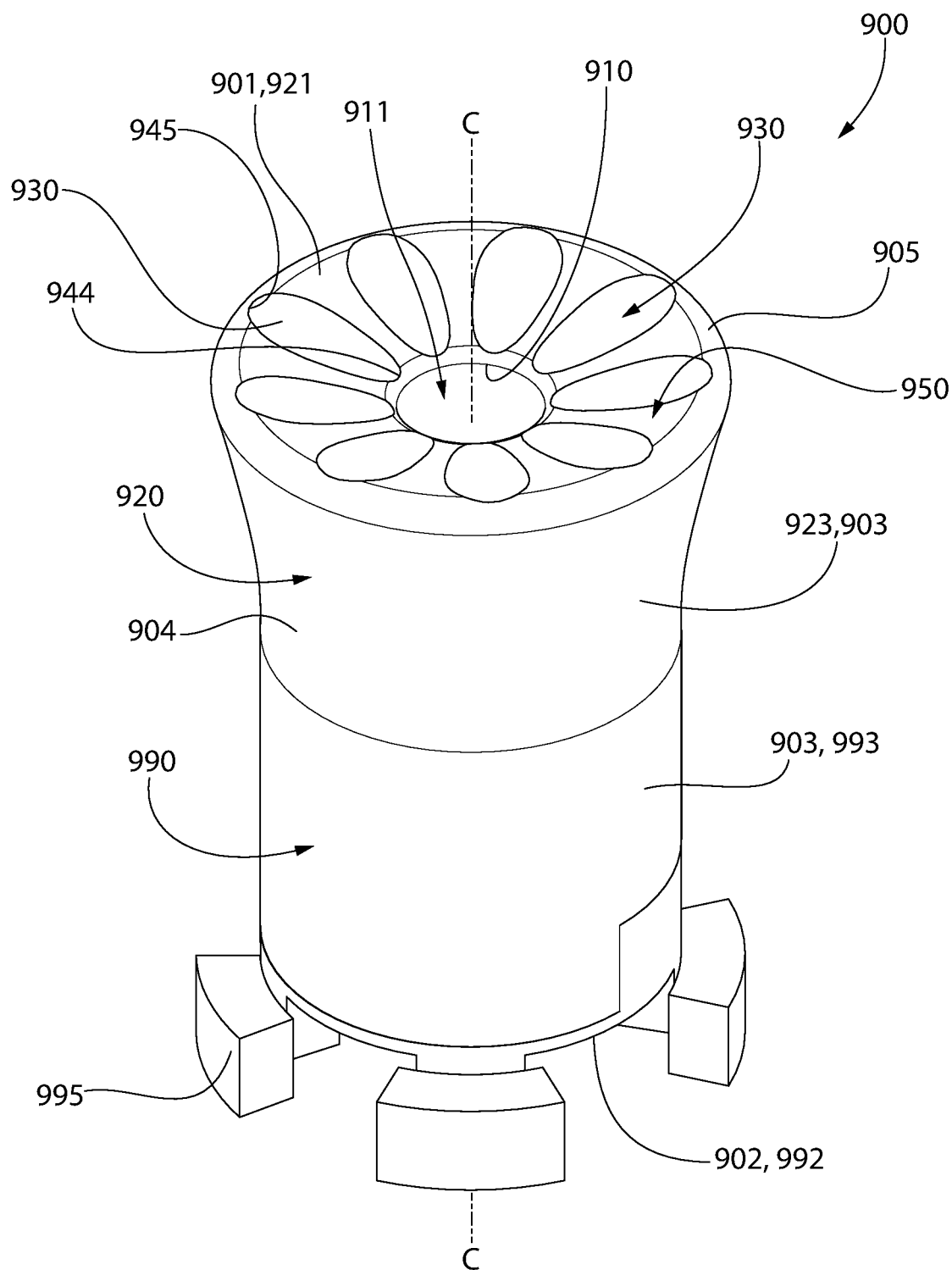
FIG. 14 is perspective of an elastomeric cleaning element according to another embodiment of the present invention.
Figure 15:
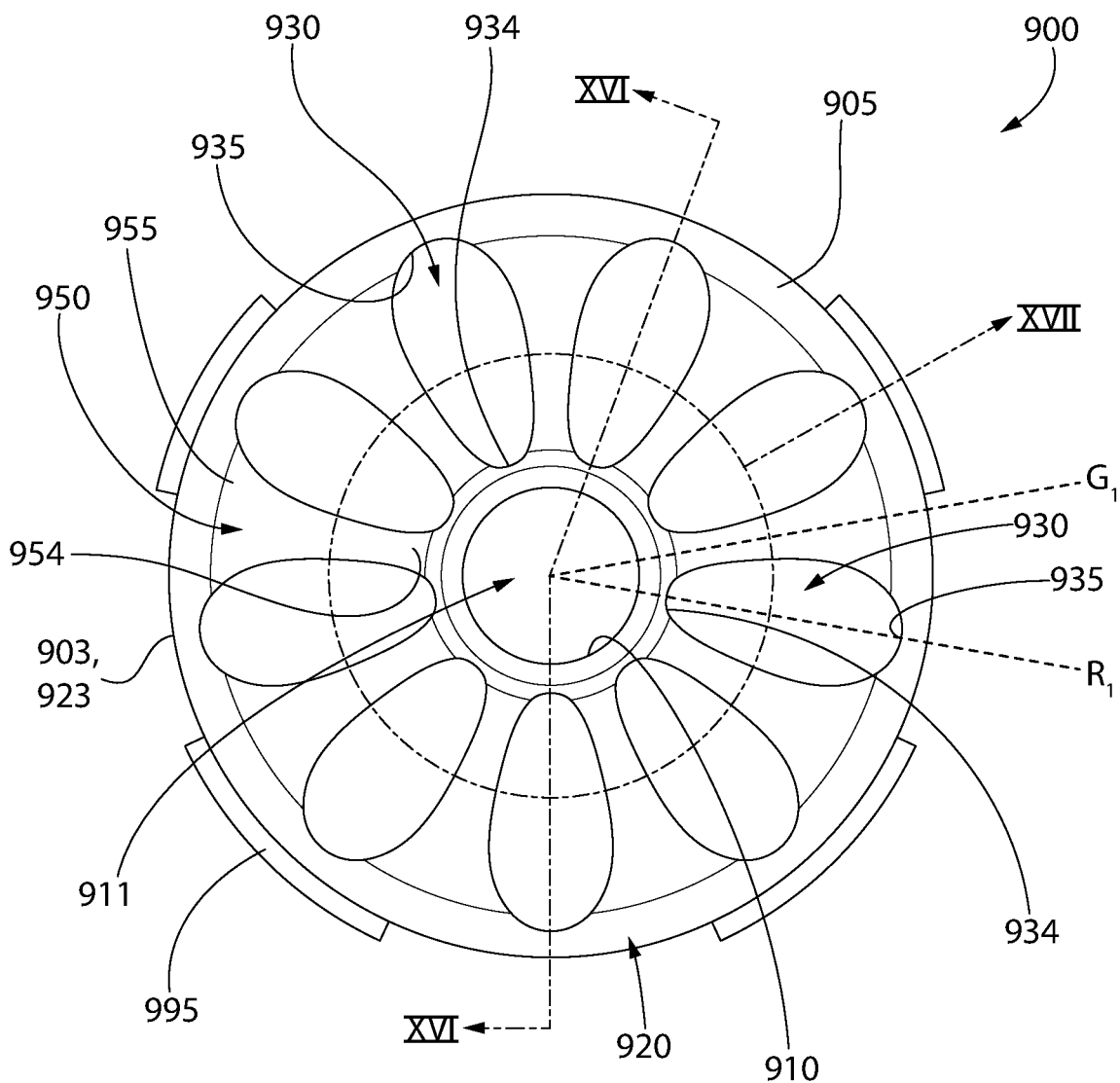
FIG. 15 is top view of the an elastomeric cleaning element of FIG. 14.

Referring now to FIGS. 10-12, the cup member 820 may comprise a plurality of grooves 830 that are formed in the top surface 821 of the cup member 820 extending downward into the cup member 820 toward the bottom surface 802 of the elastomeric cleaning element 800. Each of the plurality of grooves 830 may extend along a groove axis $G_1$, $G_2$ that extends radially outward from the first axis C-C—as discussed further herein.

The plurality of grooves 830 may comprise a plurality of first grooves 831 and second grooves 841. Each of the first grooves 831 may extend along a first groove axis $G_1$ that extends radially outward from the first axis C-C, and each of the second grooves 841 may extend along a second groove axis $G_2$ that extends radially outward from the first axis C-C.

The plurality of first grooves 831 and second grooves 841 may be arranged in a repeating circumferential pattern about the first axis C-C. The repeating circumferential pattern may be such that the first grooves 831 and the second grooves 841 alternate circumferentially about the first axis C-C. The repeating circumferential pattern may be such that multiples of either the first grooves 831 or the second groove 841 are adjacent to each without one of the other second groove 841 or first groove 831 are positioned there-between.

Referring now to FIG. 12, each of the first grooves 831 may comprise a first groove floor 832 and each of the second grooves 841 may comprise a second groove floor 842. The first groove 831 may have a first groove depth that is the distance between the first groove floor 832 and the distal surface 822 of the top surface 821 of the cup member 820 as viewed in a direction that is parallel to the first axis C-C. The second groove 841 may have a second groove depth that is the distance between the second groove floor 842 and the distal surface 822 of the top surface 821 of the cup member 820 as viewed in a direction that is parallel to the first axis C-C.

Each of the first grooves 831 may have a first maximum depth $D_5$ as measured from the distal surface 822 of the cup member 820 to a deepest point 833 of the first groove floor 832 in a direction that is parallel to the first axis C-C. Each of the second grooves 841 may have a second maximum depth $D_6$ as measured from the distal surface 822 to a deepest point 843 of the second groove floor 842 in a direction parallel to the first axis C-C.

Each of the first groove floors 832 may extend radially between a starting point 834 and an ending point 835, whereby the starting point 834 is closest to the first axis C-C and the ending point 835 is farthest from the first axis C-C along the first groove axis $G_1$. The ending point 835 may intersect with the annular wall 805 such that the first grooves are encapsulated by the annular wall 805 and the side wall 823 thereby forming a continuous outer surface on the side wall 823 of the cup member 820.

Each of the second groove floors 842 may extend radially between a starting point 844 and an ending point 845, whereby the starting point 844 is closest to the first axis C-C and the ending point 845 is farthest from the first axis C-C along the second groove axis $G_2$. The ending point 845 may intersect with the annular wall 805 such that the second grooves 840 are encapsulated by the annular wall 805, thereby forming a continuous outer surface on the side wall 823 of the cup member 820.

The first groove depth of the first groove 831 may decrease with distance from the first axis C-C. The starting point 834 of the first groove 831 may be located between the cavity floor 812 and the ending point 835 of the first groove 831 when viewed along a direction that is parallel to the first axis C-C. The second groove depth of the second groove 841 may decrease with distance from the first axis C-C. The starting point 844 of the second groove 841 may be located between the cavity floor 812 and the ending point 845 of the second groove 841 when viewed along a direction that is parallel to the first axis C-C. The second groove depth at the starting point 844 of the second groove 841 may be greater than the first groove depth at the starting point of the first groove 831. The second maximum groove depth $D_6$ of the second groove 841 may be greater than the first maximum groove depth $D_5$ of the first groove 831.

The starting point 844 of the second grooves 841 may intersect with the inner wall 810 of the central cavity 813 such that each of the second grooves 841 forms a notch of the inner wall 810 of the cup member 820. The notches formed by the second grooves 841 may result in the inner wall 810 of the cup member 820 being discontinuous about the first axis C-C.

The elastomeric cleaning element 800 may comprise a plurality of rib members 840. Adjacent ones of the grooves 830 are separated by one of the rib members 840. The plurality of ribs members 850 extend along a rib axis $R_1$, $R_2$ that extends radially outward from the first axis C-C—as discussed further herein. Each of the rib members 850 has a thickness that increases when measured along the rib axis $R_1$, $R_2$ as the distance from the first axis C-C increases.

The plurality of rib members 850 may comprise a plurality of first rib members 851. The plurality of rib members 850 may comprise a plurality of second rib members 861. Each of the first rib members 851 may extend along a first rib axis $R_1$ and each of the second rib members 861 may extend along a second rib axis $R_2$— whereby the first and second rib axis's $R_1$, $R_2$ extend radially outward from the first axis C-C.

The plurality of first rib members 851 and second rib members 861 may be arranged in a repeating circumferential pattern about the first axis C-C. The repeating circumferential pattern may be such that the first rib members 851 and the second rib members 861 alternate circumferentially about the first axis C-C. The repeating circumferential pattern may be such that multiples of either the first rib member 851 and/or the second rib members 861 are adjacent to each without the other of the second rib member 861 or the first rib member 851 being positioned there-between. The first rib member 851 may be positioned between two adjacent first grooves 831. The second rib member 861 may be positioned between the first groove 831.

Each of the first rib members 851 may extend radially between a starting point 854 and an ending point 855, whereby the starting point 854 is closest to the first axis C-C and the ending point 855 is farthest from the first axis C-C along the first rib axis $R_1$. The starting point 854 may be adjacent to the inner surface 810 that defines the central cavity 810. Each of the second rib members 861 may extend radially between a starting point 864 and an ending point 865, whereby the starting point 864 is closest to the first axis C-C and the ending point 865 is farthest from the first axis C-C along the second rib axis $R_2$. The starting point 864 may be adjacent to the inner surface 810 that defines the central cavity 810. The ending points 855, 865 of both the first and second rib members 850, 860 may intersect with the annular wall 805 of the elastomeric cleaning element 805. Stated otherwise, each of the first rib members 851 may extend radially from the first axis C-C such that the ending point 855 of the first rib member 851 intersects with the side wall 820 of the cup member 820.

The first rib members 851 may extend out radially from the first axis C-C such that the first rib member 851 becomes wider with distance. The first rib members 851 may become wider symmetrically with distance from the first axis C-C. The second rib members 861 may extend out radially from the first axis C-C such that the second rib members 861 becomes wider with distance. The second rib members 861 may become wider asymmetrically with distance from the first axis C-C. The ending point 855 of the first rib member 851 may extend to the distal surface 822 of the cup member 820. The ending point 865 of the second rib member 861 may extend to the distal surface 822 of the cup member 820.

Referring now to FIGS. 14-17, an elastomeric cleaning element 900 is illustrated in accordance with another embodiment of the present invention. The elastomeric cleaning element 900 is similar to the elastomeric cleaning elements 700 and 800 except as described herein below. The description of the elastomeric cleaning elements 700 and 800 generally applies to the elastomeric cleaning element 900 described below except with regard to the differences specifically noted below. A similar numbering scheme will be used for the elastomeric cleaning element 900 as with the elastomeric cleaning elements 700 and 800 except that the 900-series of numbers will be used.

The elastomeric cleaning element 900 may be a cup member 920. The cup member 920 may comprise a plurality of grooves 930 that are formed in the top surface 921 of the cup member 920 extending downward into the cup member 920 toward the bottom surface 902 of the elastomeric cleaning element 900. Each of the plurality of grooves 930 may extend along a groove axis $G_1$ that extends radially outward from the first axis C-C—as discussed further herein. The plurality of grooves 930 may be arranged in a repeating circumferential pattern about the first axis C-C.

Figure 16:
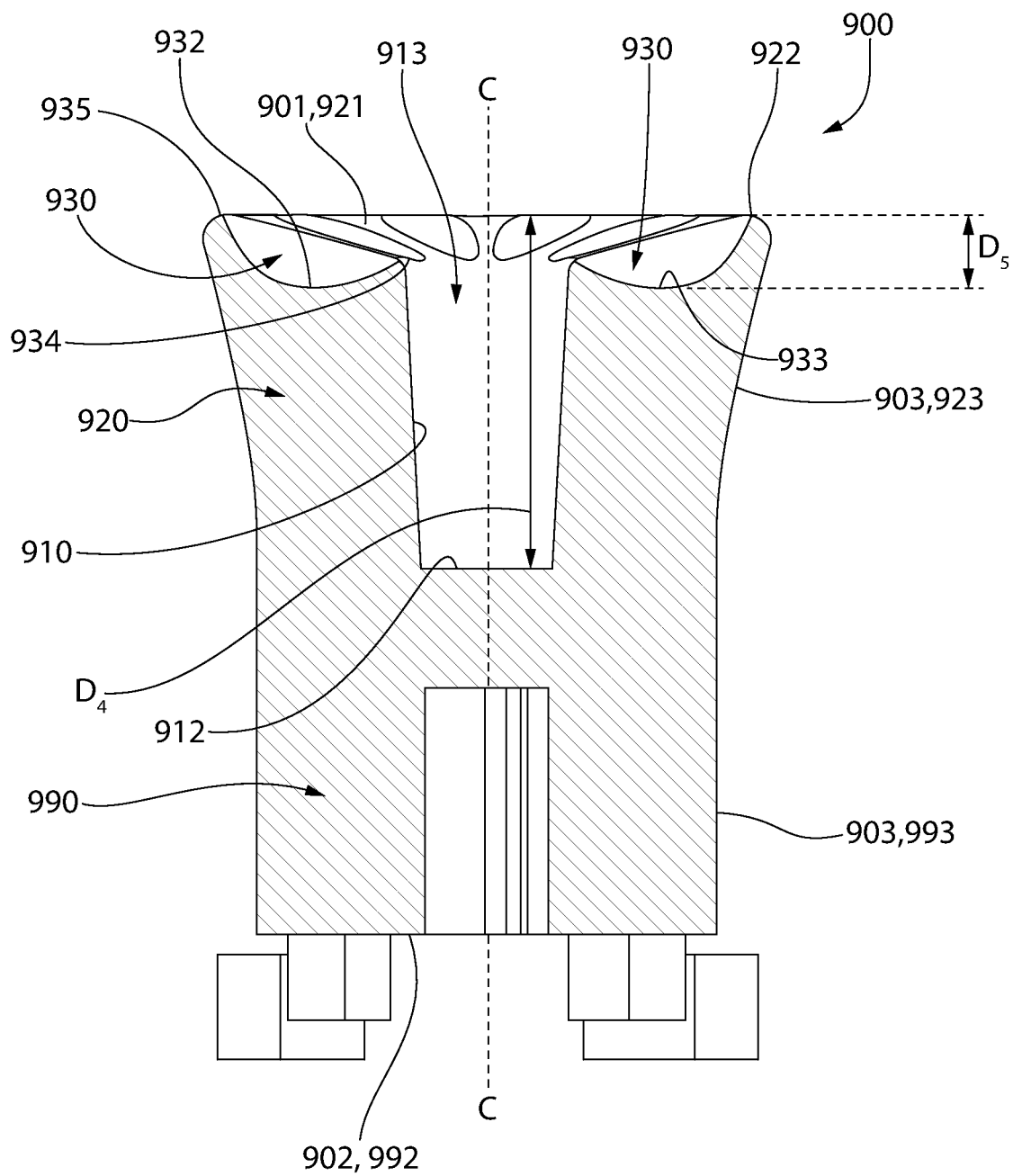
FIG. 16 is a cross-sectional view taken along line XVI-XVI in FIG. 15.
Figure 17:
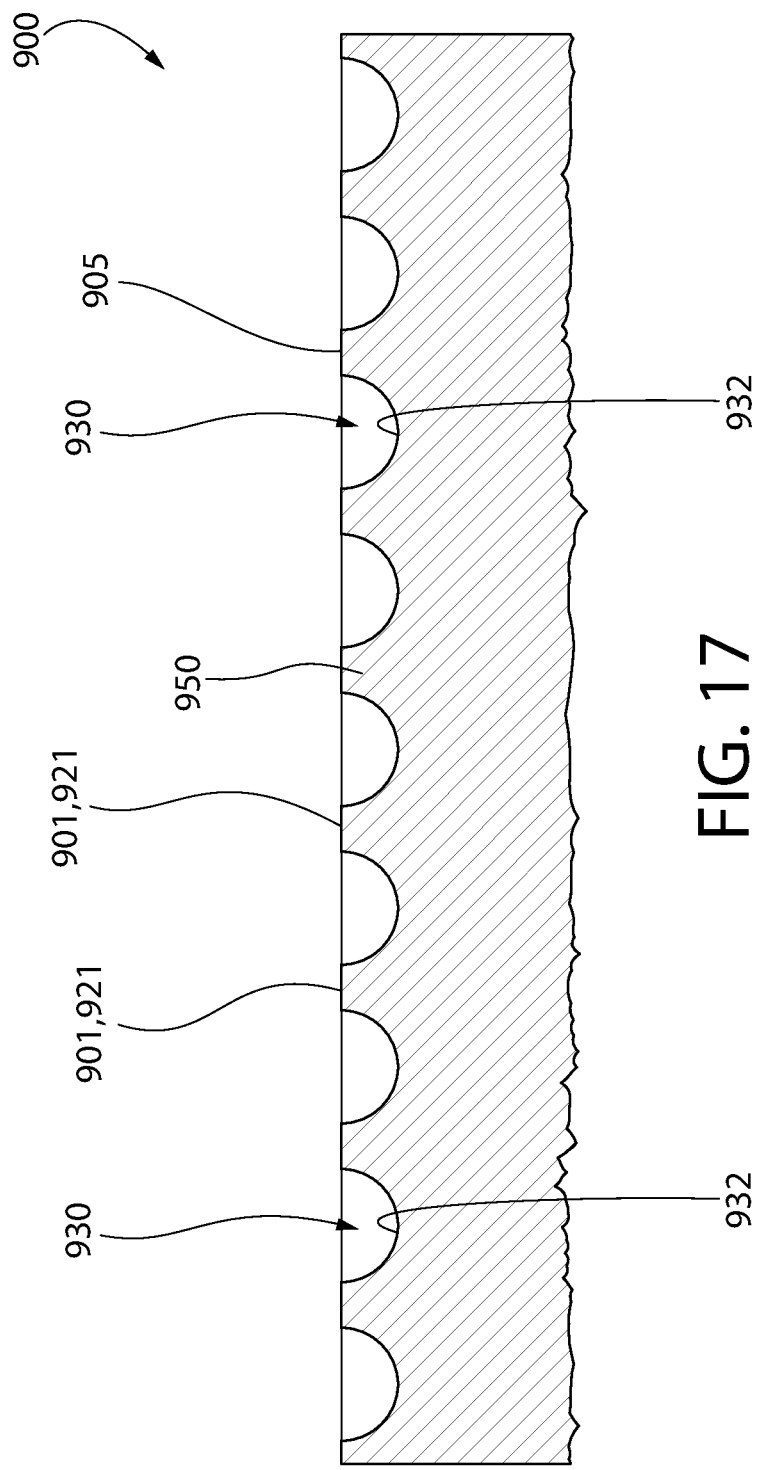
FIG. 17 is a cross-sectional view taken along line XVII in FIG. 15.

Referring now to FIG. 16, each of the grooves 930 may comprise a groove floor 932. The grooves 930 may have a groove depth that is the distance between the groove floor 932 and the distal surface 922 of the elastomeric cleaning element 900 as viewed in a direction that is parallel to the first axis C-C. The grooves 930 may have a maximum depth $D_5$ as measured from the distal surface 922 to a deepest point 933 of the groove floor 932 in a direction that is parallel to the first axis C-C. The grooves 930 of this embodiment may share the same geometry.

Each of the groove floors 932 may extend radially between a starting point 934 and an ending point 935, whereby the starting point 934 is closest to the first axis C-C and the ending point 935 is farthest from the first axis C-C along the first groove axis $G_1$. The groove depth of the groove 930 may decrease with distance from the first axis C-C. The starting point 934 of the groove 930 may be located between the cavity floor 912 and the ending point 935 of the groove 930 when viewed along a direction that is parallel to the first axis C-C.

The starting point 934 of the groove 930 may terminate at the inner wall 910 and the ending point 935 of the cup member 920. The inner wall 910 and the annular wall 905 may each form continuous surfaces, thereby encapsulating each of the grooves 930 at the starting point 934 and the ending point 935.

The elastomeric cleaning element 900 may comprise a plurality of rib members 940. Adjacent ones of the grooves 930 are separated by one of the rib members 940. The plurality of ribs members 950 extend along a rib axis $R_1$ that extends radially outward from the first axis C-C. Each of the rib members 950 has a thickness that increases when measured along the rib axis $R_1$ as the distance from the first axis C-C increases. The plurality of rib members 950 may be arranged in a repeating circumferential pattern about the first axis C-C.

Each of the rib members 950 may extend radially between a starting point 954 and an ending point 955, whereby the starting point 954 is closest to the first axis C-C and the ending point 955 is farthest from the first axis C-C along the first rib axis $R_1$. The starting point 954 may be adjacent to the inner surface 910 of the cup member 920. The ending point 955 of the rib members 950 may intersect with the annular wall 905 of the elastomeric cleaning element 905. Stated otherwise, each of the rib members 950 may extend radially from the first axis C-C such that the ending point 955 of the rib member 950 intersects with the side wall 920 of the cup member 920. The repeating circumferential pattern of the rib members 940 and grooves 930 may be such that the grooves 930 are encapsulated by the inner wall 910, the rib members 940, and the annular wall 905. The ending point 955 of the rib member 950 may extend to the distal surface 922 of the cup member 920.

The rib members 950 may extend out radially from the first axis C-C such that the rib member 950 becomes wider with distance. Each of the rib members 950 may become wider symmetrically with distance from the first axis C-C.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An oral care implement for detachable coupling to a handle having a power source and a motor including a drive shaft, the oral care implement comprising:
   a drive assembly having a first portion configured to operably engage the drive shaft of the motor;
   a head portion comprising:
      a body;
      a first carrier comprising a plurality of bristle tufts extending from the first carrier, the first carrier comprising a central passageway; and
      a second carrier disposed within the central passageway of the first carrier, the second carrier comprising an elastomeric cleaning element extending from the second carrier; and
   the drive assembly having a second portion operably coupled to each of the first and second carriers and configured to: (1) produce a first oscillatory motion of the first carrier about a first rotational axis; and (2) produce a second oscillatory motion of the second carrier, the second oscillatory motion being counter to the first oscillatory motion;
   wherein the elastomeric element is a cup member that extends along a first axis, the cup member comprising a plurality of grooves formed in a top surface of the cup member, each of the grooves extending along a groove axis that extends radially outward from the first axis; and
   wherein the grooves have a depth that increases with distance from the first axis.

2. The oral care implement according to claim 1 further comprising a third carrier having a plurality of tooth cleaning elements extending from the third carrier, the third carrier being fixed relative to the body of the head portion.

3. The oral care implement according to claim 2 wherein the tooth cleaning elements extending from the third carrier comprises a plurality of rows of bristle tufts having a square transverse cross-section and a plurality of rows of bristle tufts having a circular transverse cross-section arranged in an alternating pattern.

4. The oral care implement according to claim 1 further comprising an attachment portion configured to detachably couple the oral care implement to the handle, the body of the head portion coupled to the attachment portion.

5. The oral care implement according to claim 1 wherein the first carrier is an annular structure; and wherein the bristle tufts of the first carrier are arranged in a spaced-apart pattern that circumferentially surrounds the elastomeric cleaning element.

6. The oral care implement according to claim 1 wherein the elastomeric cleaning element is the only tooth cleaning located on the second carrier.

7. The oral care implement according to claim 1 wherein the grooves comprise a plurality of first grooves and a plurality of second grooves; and wherein, taken along a reference cylinder about the first axis, each of the first grooves has a first transverse cross-section and each of the second grooves has a second transverse cross-section, the first and second transverse cross-sections being different from one another.

8. The oral care implement according to claim 1 wherein adjacent ones of the grooves are separated by a rib member that extends along a rib axis that extends radially outward from the first axis; and wherein the rib member has a thickness that increases with distance from the first axis.

9. The oral care implement according to claim 1 wherein the cup member comprises an inner surface that defines a central cavity having a cavity floor and an open top end; and wherein the central cavity has a depth that is greater than the depths of the grooves.

10. The oral care implement according to claim 1 wherein the top surface of the cup member is sloped upward with distance from the first axis.

11. The oral care implement according to claim 1 wherein the elastomeric cleaning element has a first diameter and the head portion has a transverse width; and wherein the first diameter is at least one half the transverse width.

12. The oral care implement according to claim 1 wherein the cup member comprises a continuous annular wall having a distal surface that forms a portion of the top surface of the cup member, and wherein the grooves terminate at an inner surface of the continuous annular wall.

* * * * *